United States Patent
Kays et al.

(10) Patent No.: US 12,420,940 B2
(45) Date of Patent: Sep. 23, 2025

(54) HYBRID PROPULSION FOR AIRBORNE CRAFT

(71) Applicant: Regent Craft, Inc., North Kingstown, RI (US)

(72) Inventors: Cory Asher Kays, Ft. Thomas, KY (US); Daniel Cottrell, Centreville, VA (US); William Thalheimer, Cranston, RI (US); Michael Klinker, East Greenwich, RI (US); Brett C. Peters, Warwick, RI (US)

(73) Assignee: Regent Craft, Inc., North Kingstown, RI (US)

( * ) Notice: Subject to any disclaimer, the term of this patent is extended or adjusted under 35 U.S.C. 154(b) by 0 days.

(21) Appl. No.: 18/824,571

(22) Filed: Sep. 4, 2024

(65) Prior Publication Data

US 2025/0074617 A1     Mar. 6, 2025

Related U.S. Application Data

(60) Provisional application No. 63/580,943, filed on Sep. 6, 2023.

(51) Int. Cl.
*B64D 31/18* (2024.01)
*B64D 27/02* (2006.01)
(Continued)

(52) U.S. Cl.
CPC ........... *B64D 31/18* (2024.01); *B64D 27/026* (2024.01); *B64D 27/31* (2024.01); *B64D 27/40* (2024.01)

(58) Field of Classification Search
CPC ........ B64D 31/18; B64D 27/31; B64D 27/40; B64D 27/026; B64D 27/02
See application file for complete search history.

(56) References Cited

U.S. PATENT DOCUMENTS 1,861,491 A    6/1932   Capelis
2,793,827 A    5/1957   Ries et al.
(Continued)

FOREIGN PATENT DOCUMENTS

| | | |
|---|---|---|
| CN | 104199462 A | 12/2014 |
| JP | 2018167792 A | 11/2018 |
| KR | 101615720 B1 | 4/2016 |

OTHER PUBLICATIONS

Non-Final Office Action mailed on Apr. 24, 2025 in U.S. Appl. No. 17/845,480 (14 pages).
(Continued)

*Primary Examiner* — Rodney A Bonnette
(74) *Attorney, Agent, or Firm* — Akerman LLP

(57) ABSTRACT

A craft comprises at least one hull, a main wing coupled to the hull and configured to facilitate airborne operations of the craft, a plurality of propellers that include one or more electric motor propellers and one or more combustion motor propellers arranged along each of a port side and a starboard side of the main wing and configured to generate lift on the craft by blowing air over the main wing, and a control system. The control system comprises data storage having instruction code stored thereon that, when executed by one or more processors of the control system, causes the control system to: after receiving a takeoff indication, increase thrust generated by the electric motor propellers to cause the craft to transition from a hull-borne mode of operation to an airborne mode of operation, and after a thrust adjustment condition occurs, increase thrust generated by the combustion motor propellers.

20 Claims, 19 Drawing Sheets

(51) Int. Cl.
  *B64D 27/31* (2024.01)
  *B64D 27/40* (2024.01)

(56) References Cited

U.S. PATENT DOCUMENTS

| | | | |
|---|---|---|---|
| 2,844,339 | A | 7/1958 | Stroukoff |
| 3,082,975 | A | 3/1963 | Cardwell et al. |
| 3,139,059 | A | 6/1964 | Hanford, Jr. |
| 3,750,978 | A | 8/1973 | Cunningham |
| 4,589,611 | A | 5/1986 | Ramme et al. |
| 4,962,978 | A | 10/1990 | Weston |
| 6,086,014 | A | 7/2000 | Bragg, Jr. |
| D594,811 | S | 6/2009 | Cazals |
| 8,152,095 | B2 | 4/2012 | Cazals et al. |
| 8,371,520 | B2 | 2/2013 | Easter |
| 9,096,312 | B2 | 8/2015 | Moxon |
| 11,667,352 | B2 | 6/2023 | Leason et al. |
| 2017/0253322 | A1 | 9/2017 | Krebs |
| 2017/0308099 | A1 | 10/2017 | Kim et al. |
| 2018/0343050 | A1 | 11/2018 | Tillotson |
| 2019/0128570 | A1* | 5/2019 | Moxon ................ B64D 27/357 |
| 2020/0017228 | A1* | 1/2020 | Combs ................ B64D 35/023 |
| 2020/0180756 | A1* | 6/2020 | Kapeter ................ B64U 50/13 |
| 2020/0277061 | A1* | 9/2020 | Becker .................... B60L 50/16 |
| 2021/0223385 | A1 | 7/2021 | Breton et al. |
| 2021/0403168 | A1* | 12/2021 | Parsons .................. B64D 35/02 |
| 2022/0046177 | A1 | 2/2022 | Honjo et al. |
| 2022/0119113 | A1 | 4/2022 | Wilson |
| 2022/0250743 | A1* | 8/2022 | Thalheimer ............... B63B 1/24 |
| 2022/0324560 | A1* | 10/2022 | Klinker ................. B64C 35/006 |
| 2022/0382300 | A1* | 12/2022 | Larson .................... B64C 25/10 |
| 2023/0062717 | A1* | 3/2023 | Thalheimer ............... B63B 1/24 |
| 2023/0257108 | A1 | 8/2023 | Page |
| 2023/0358888 | A1 | 11/2023 | Lustig et al. |
| 2023/0409049 | A1 | 12/2023 | Isler et al. |
| 2024/0043133 | A1* | 2/2024 | Giannini .............. B64D 35/023 |
| 2024/0208648 | A1* | 6/2024 | Klinker ................... B60V 1/08 |
| 2024/0326990 | A1* | 10/2024 | Buskirk ................ B64C 35/007 |

OTHER PUBLICATIONS

Non-Final Office Action mailed on Jun. 3, 2025 in U.S. Appl. No. 18/613,578 (13 pages).

Non-Final Office Action mailed on Apr. 23, 2025 in U.S. Appl. No. 17/892,484 (15 pages).

Non-Final Office Action mailed on Jun. 20, 2025 in U.S. Appl. No. 17/875,942 (23 pages).

* cited by examiner

HULL-BORNE OPERATION

HYDROFOIL-BORNE
MANEUVERING OPERATION

HYDROFOIL-BORNE TAKEOFF
OPERATION

WING-BORNE OPERATION

HYBRID PROPULSION FOR AIRBORNE CRAFT

CROSS-REFERENCE TO RELATED APPLICATIONS

The present application claims priority to U.S. Provisional App. 63/580,943 titled "Hybrid Propulsion for Airborne Craft," filed on Sep. 6, 2023. The entire contents of U.S. Provisional App. 63/580,943 are incorporated herein by reference.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1A:
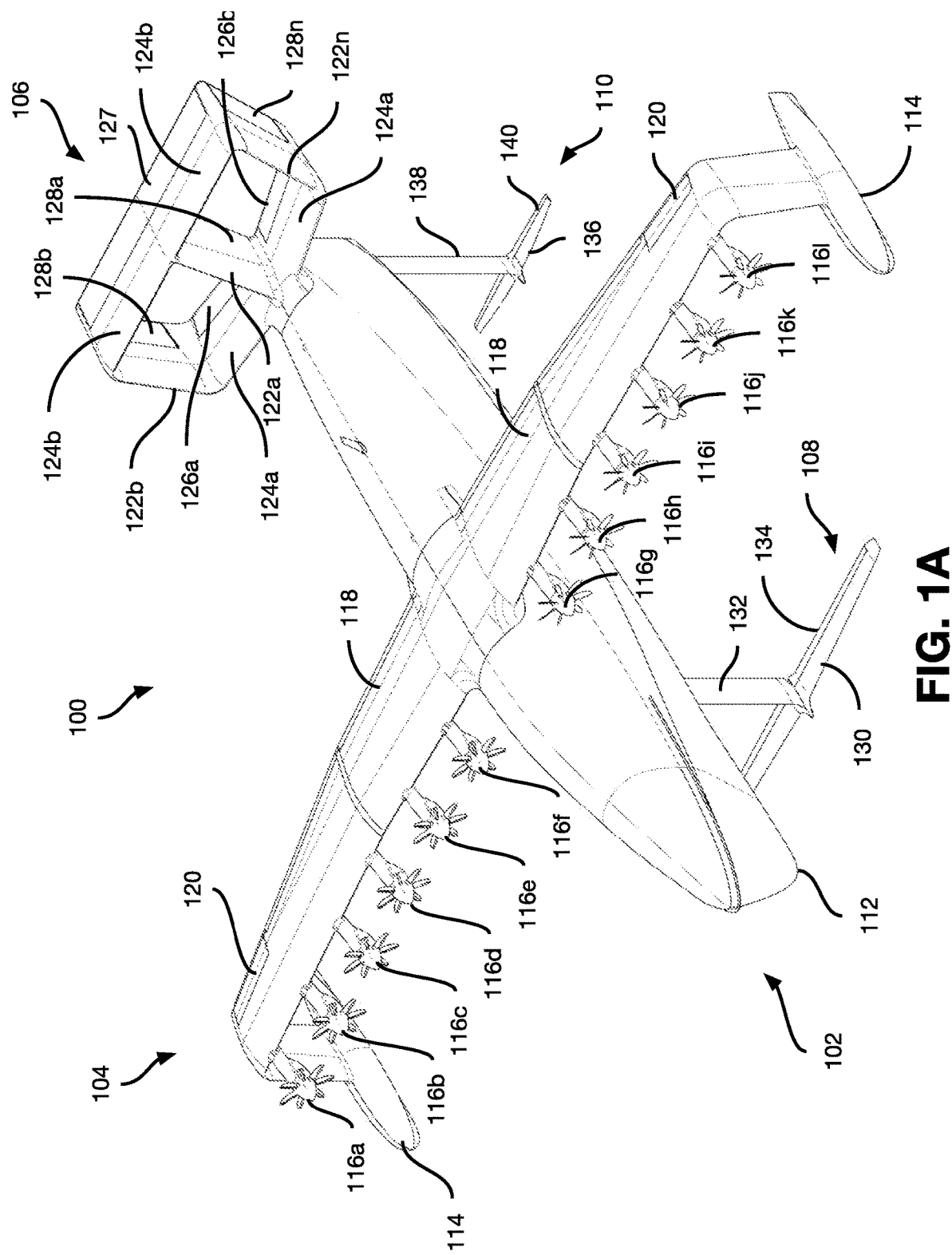
FIG. 1A illustrates a perspective view of a craft, in accordance with example embodiments.
Figure 1B:
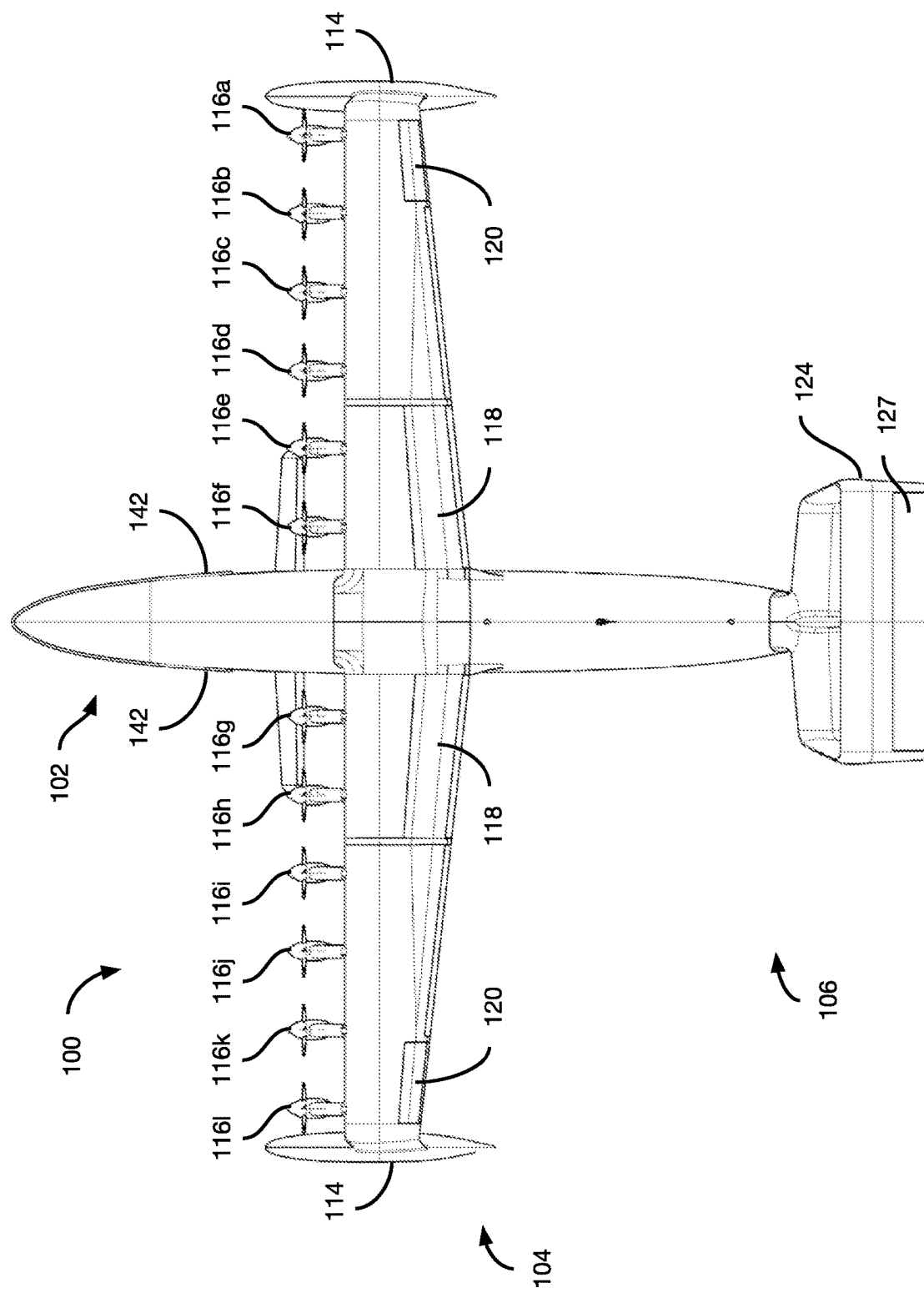
FIG. 1B illustrates a top view of a craft, in accordance with example embodiments.
Figure 1C:
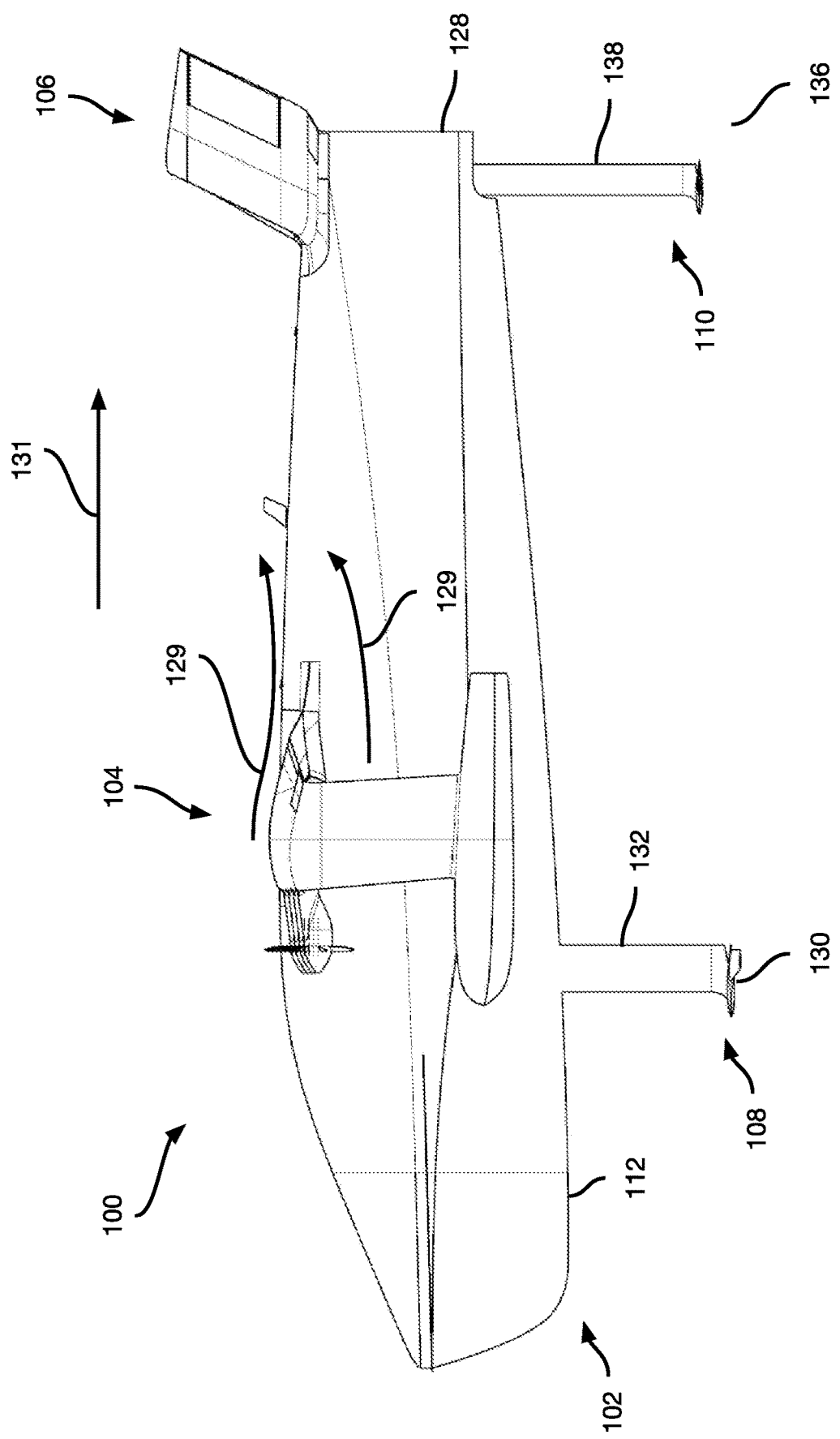
FIG. 1C illustrates a side view of a craft, in accordance with example embodiments

Various examples of systems, devices, and/or methods are described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

I. INTRODUCTION

Aspects described herein are generally related to craft, such as aircraft, including craft that are capable of taking off from, and landing on, water. Examples of such craft include crafts having extendible hydrofoils attached to the hull of the craft. For instance, a first (or "rear") hydrofoil may be positioned towards the tail section of the craft, and a second (or "main") hydrofoil may be positioned near the midsection of the craft, forward the first hydrofoil (e.g., proximate to the main wing of the craft). The hydrofoils may be controlled to extend and retract depending on the operating mode of the craft. For example, when airborne, the hydrofoils may be retracted towards the hull, and when waterborne, the hydrofoils may be extended.

In some examples, the craft may additionally or alternatively be a wing-in-ground (WIG) effect craft. Such craft fly close to the ground or water surface by using the ground effect principle, where flying close to the surface reduces aerodynamic drag and increases lift. For example, the drag on the craft is reduced when its distance from the ground is within about half the length of the aircraft's wingspan.

Some examples of these craft have several propellers driven by electric motors (sometimes referred to herein as "electric motor propellers") distributed across the main wing. These propellers receive power primarily from onboard batteries that may be recharged from time-to-time from ground-based charging stations. Craft operating solely on battery power may not have the range of craft that carry fuel and that are propelled using combustion motor propellers. On the other hand, propellers driven by internal combustion motors (sometimes referred to herein as internal combustion propellers or combustion motor propellers) tend to be less environmentally friendly, have relatively hot exhaust gasses, and/or may be associated with other downsides such as relatively lower reliability as compared to electric motors. Some existing examples of craft attempt to address these issues by using hybrid-motor propellers that can switch between operating as a combustion motor and operating as an electric motor. Hybrid-motor propellers, however, may be more expensive, complex, and more difficult to maintain than traditional combustion motors or electric motors.

Various examples of craft that include propulsion systems that balance these considerations are described below. Some examples of these craft include a hull (or fuselage) and a main wing coupled to the hull (or fuselage) that facilitates airborne operations of the craft. In some embodiments, one or more electric motor propellers and one or more combustion motor propellers are arranged along each of a port side and a starboard side of the main wing. The propellers are configured to generate lift on the craft by blowing air over the main wing. A control system of the craft is configured to engage and disengage the electric motor propellers and the combustion motor propellers based on the operating condition of the craft. For example, after receiving a takeoff indication, the control system engages one or more of the electric motor propellers to cause the craft to transition from a hull-borne mode of operation to an airborne mode of operation. After a thrust adjustment condition occurs (e.g., the craft reaches a particular cruising altitude or cruising airspeed), the control system engages and/or increases the thrust generated by one or more of the combustion motor propellers. In this regard, in some examples, the control system maintains the combustion motor propellers in a disengaged state up until the craft reaches the cruising conditions.

In some examples, after the thrust adjustment condition occurs, the control system disengages and/or reduces the thrust of one or more of the electric motor propellers. In some examples, if more thrust is desired, the control system may engage previously disengaged electric motor propellers. For example, if the craft experiences strong headwinds or if one or more of the combustion motor propellers fails or otherwise becomes compromised, the control system may engage previously disengaged electric motor propellers to compensate. On the other hand, if less thrust is required, the control system may disengage some of the engaged electric motor propellers. In some examples, the control system dynamically engages and disengages the electric motor propellers based on the amount of thrust required.

In some examples, the combustion motor propellers are engaged during other and/or additional stages of operations. For instance, the combustion motor propellers may be engaged while the craft is hull-borne, hydrofoil-borne, taking off and/or landing. In some examples, a relatively static amount of thrust may be generated by combustion motor propellers during these stages of operations. In some other examples, the thrust may vary depending on a desired amount of thrust that may be required during these stages. In some other examples, the thrust may vary depending on whether the electric motor propellers are providing thrust. For instance, less thrust may be needed from the combustion motor propellers during those stages in which the electric motor propellers are engaged.

In some examples, a first combustion motor propeller is positioned on the port side of the main wing, and a second combustion motor propeller is positioned on the starboard side of the main wing. In some examples, the first combustion motor propeller and the second combustion motor propeller are positioned nearest to the hull. In some examples, the first combustion motor propeller and the second combustion motor propeller are positioned at respective sections of the main wing such that a wake of air generated by the first combustion motor propeller and the second combustion motor propeller contributes less control authority over the craft than other propellers of the plurality of propellers. For example, the first combustion motor propeller and the second combustion motor propeller may be positioned relatively far from the ailerons and/or flaperons of the main wing. In some other examples, the first combustion motor propeller and the second combustion motor propeller are positioned at respective sections of the main wing such that a wake of air generated by the first combustion motor propeller and the second combustion motor propeller contributes more control authority over the craft than other propellers of the plurality of propellers. For example, the first combustion motor propeller and the second combustion motor propeller may be positioned forward of the ailerons and/or the flaps of the main wing. In this regard, in some examples, the flaps are positioned on the inward sections of the main wing (e.g., near the hull) and the combustion motor propellers blow air over the flaps. Some examples of the combustion motor propellers may be capable of providing more torque at lower speeds than may be possible using electric motor propellers. In some examples, the blades of the combustion motor propellers are sized/configured (e.g., may have higher solidity) to induce more flow over these sections of the main wing.

In some examples, disengaging the electric motor propellers involves spinning down the electric motor propellers so that they stop rotating. In some examples, disengaging the electric motor propellers involves spinning down the electric motor propellers to a threshold point at which they introduce neither thrust nor drag.

In some examples, disengaging the electric motor propellers involves (or may further involve) feathering the blades of the electric motor propellers to reduce drag generated by the electric motor propellers. For example, the pitch of the blades may be increased to the point that the chord line of the blades is approximately parallel to the on-coming airflow to reduce the drag generated by the electric motor propellers.

In some examples, disengaging the electric motor propellers involves (or may further involve) folding the blades of the electric motor propellers inward to reduce drag generated by the electric motor propellers. For example, the blades may be spring-loaded such that centrifugal forces acting on the blades when the electric motor propellers are spinning causes the blades to spin outward and provide thrust. When the electric motor propellers are spun down, springs of the electric motor propellers may urge the blades inward to a folded configuration.

In some examples, the electric motor propellers are engaged and disengaged (or the thrust is adjusted) in pairs. For example, a first electric motor propeller that is on the port side of the main wing and a second electric motor propeller on the starboard side of the main wing that is symmetrically opposite the first electric motor propeller are engaged and disengaged (or thrust adjusted) at the same time. This reduces the chance of introducing a yaw or roll moment in the craft due to the engaging and disengaging of the electric motor propellers.

In some examples, the control system determines the amount of wear of each of the electric motor propellers and selects electric motor propellers for engagement based on their respective amount of wear. The amount of wear may depend on various factors such as the operating/up time of the electric motor propellers, the average rotation rate of the electric motor propellers during this time, environmental conditions under which the electric motor propellers operate, etc. As an example, the control system may select those electric motor propellers having the lowest operating time. In some examples, where symmetrical pairs of electric motor propellers are to be engaged, the control system selects symmetrical pairs of the electric motor propellers having the lowest average operating time.

Some examples of WIG craft that are configured to take off from water are described herein. These craft include retractable hydrofoils that are extended during takeoff to generate additional upward lift as the craft approaches take-off speeds. The upward lift raises the hull of the craft above the water. This action (i) reduces the wetted surface area of the craft and therefore drag on the craft and (ii) allows the craft to cruise through rough waters during takeoff without colliding with waves. Once airborne, the hydrofoils may be retracted. Some examples of these craft include and implement features disclosed in U.S. patent application Ser. No. 17/570,090, titled "Wing-In-Ground Effect Vehicle," filed Jan. 6, 2022 (herein after '090 application), and U.S. patent application Ser. No. 17/845,480, titled "Airborne Vehicle With Multi-Airfoil Tail," filed Jun. 21, 2022 (herein after '480 application). The '090 and '480 applications are incorporated herein by reference in their entirety. The '090 application describes, among other things, a seaglider that includes a pair of retractable hydrofoils (e.g., main and rear hydrofoils) that facilitate hydrofoil-borne operation of the craft. The '480 application describes, among other things, a seaglider that implements a bi-plane tail.

Other examples of craft to which the aspects described herein can be applied correspond to blown wing craft. In these craft, air is blown over the wings of the craft by propellers, and the blowing of the air over the wings contributes meaningfully to the overall lift acting on the craft. Examples of these craft can include 4, 5, 6, or even more propellers on each wing. Some examples of the WIG craft described herein are blown wing craft. Some of these craft include six propellers on each wing, making these craft better suited for commercial travel.

These and other aspects are discussed in more detail in the passages that follow.

II. EXAMPLE WING-IN-GROUND EFFECT VEHICLES

FIGS. 1A-1D illustrate different views of an example of a craft 100. As shown, some examples of the craft 100 include a hull 102, a main wing 104, a tail 106, a main hydrofoil assembly 108, and a rear hydrofoil assembly 110.

A. Hull

Some examples of the craft 100 operate in a first waterborne mode for an extended period of time, during which the hull 102 is at least partially submerged in water. As such, some examples of the hull 102 are configured to be watertight, particularly for surfaces of the hull that contact the water during this first waterborne operational mode. Further, some examples of the hull 102, as well as the entirety of the craft 100, are configured to be passively stable on all axes when floating in water. To help achieve this, some examples of the hull 102 include a keel (or centerline) 112, which provides improved stability and other benefits described below. Some examples of the craft 100 include various mechanisms for adjusting the center of mass of the craft 100 so that the center of mass aligns with the center of buoyancy of the craft 100. For instance, in some examples, a battery system (described in further detail below in connection with FIG. 4) of the craft 100 is electrically coupled to one or more moveable mounts. Some examples of the mounts are moved by one or more servo motors or the like. In some examples, a control system of the craft 100 is configured to detect a change in its center of buoyancy, for instance, by detecting a rotational change via an onboard gyroscope, and responsively operate the servo motors to move the battery system until the gyroscope indicates that the craft 100 has stabilized. Some examples of the craft 100 include a ballast system for pumping water or air to various tanks distributed throughout the hull 102 of the craft 100. The ballast system facilitates adjusting the center of mass of the craft 100 so that the center of mass aligns with the center of buoyancy of the craft 100. Other example systems may be used to control the center of mass of the craft 100 as well.

Additionally, or alternatively, some examples of the hull 102 are configured to reduce drag forces when both waterborne and wing-borne. For instance, some examples of the hull 102 have a high length-to-beam ratio (e.g., greater than or equal to 8), which facilitates reducing hydrodynamic drag forces when the craft 100 is under forward waterborne motion. Some examples of the keel 112 are curved or rockered to improve maneuverability when waterborne. Further, some examples of the hull 102 are configured to pierce the surface of waves (e.g., to increase passenger and crew comfort) by including a narrow, low-buoyancy bow portion of the hull 102.

B. Wing and Distributed Propulsion System

As shown in FIGS. 1A-1D, some examples of the main wing 104 include an outrigger 114 at each end of the main wing 104. The outriggers 114 (which are sometimes referred to as "wing-tip pontoons") are configured to provide a buoyant force to the main wing 104 when submerged or when otherwise in contact with the water, which improves the stability of the craft 100 during waterborne operation. Some examples of the outriggers 114 may also include integrated pumps (e.g., propeller pumps) that facilitate providing thrust in some scenarios, as described in more detail below.

Figure 1D:
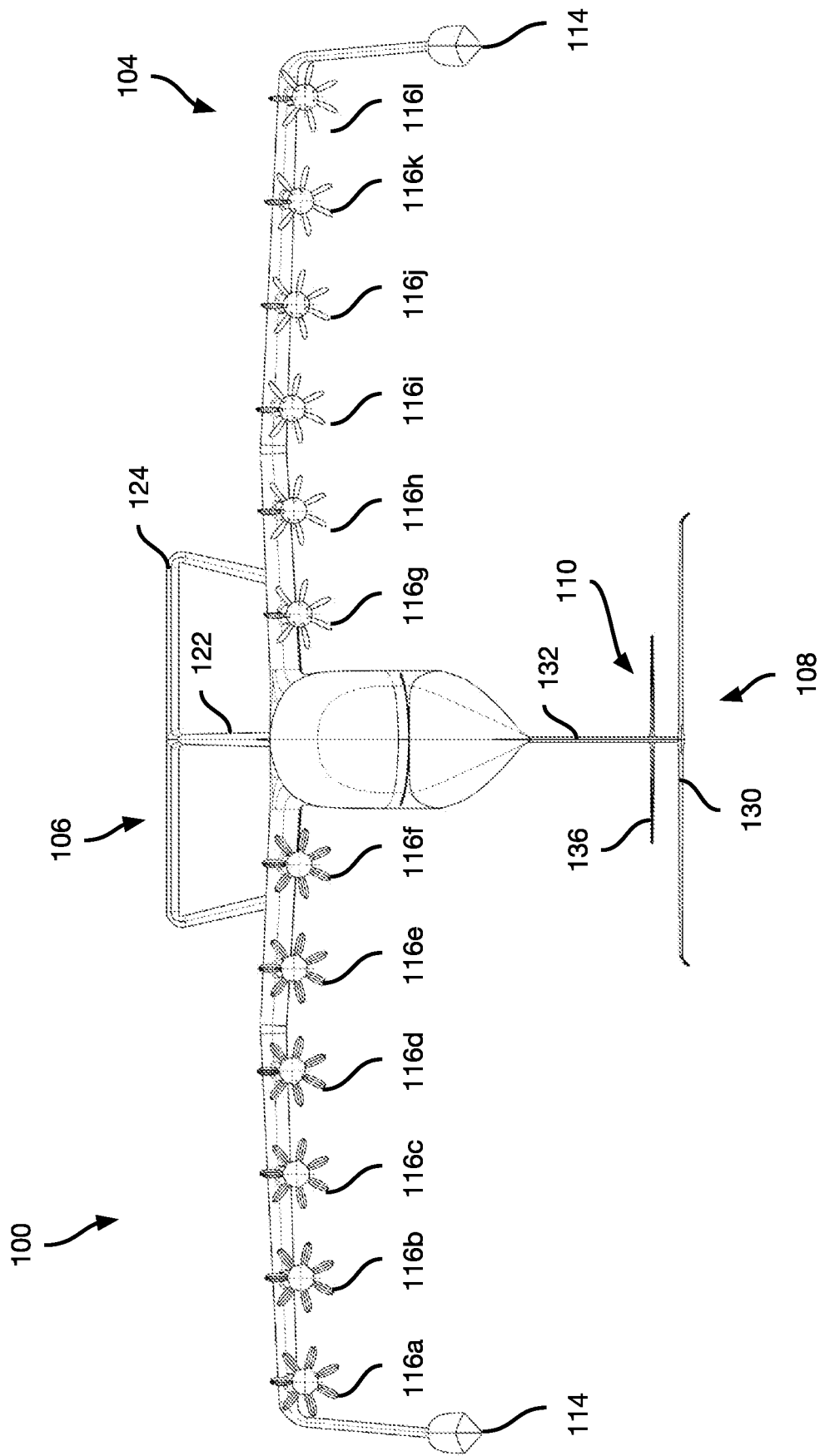
FIG. 1D illustrates a front view of a craft, in accordance with example embodiments.

As shown in FIG. 1D, some examples of the main wing 104 have a gull-wing shape such that the outriggers 114 at the ends of the main wing 104 are at the lowest point of the main wing 104 and are positioned approximately level with (or slightly above) a waterline of the hull 102 when the hull 102 is waterborne.

Some examples of the main wing 104 have a high aspect ratio, which is defined as the ratio of the span of the main wing 104 to the mean chord of the main wing 104. In some examples, the aspect ratio of the main wing 104 is greater than or equal to five, or greater than or equal to six, but other example aspect ratios are possible as well. Such wings tend to have reduced pitch stability and maneuverability due to lower roll angular acceleration. These issues are ameliorated by various mechanisms described below. On the other hand, such wings tend to have increased roll stability and increased efficiency resulting from higher lift-to-drag ratios. Further, high aspect ratio wings provide a longer leading edge for the mounting of a distributed propulsion system along the wing.

As shown in the figures, some examples of the main wing 104 include a number of propeller assemblies 116 distributed across a leading edge of the main wing 104. This arrangement corresponds to a blown-wing propulsion system. Arranging the propeller assemblies 116 in this manner increases the speed of air moving over the main wing 104, which increases the lift generated by the main wing 104. This increase in lift allows the craft 100 to take off and become wing-borne at slower vehicle speeds. This facilitates, for example, taking off on water which can be difficult at higher speeds due to the various forces that would otherwise act on the craft 100.

In some embodiments, the propeller assemblies 116 are driven by electric motors. In some instances, electric motors for driving the propeller assemblies 116 tend to be much lighter, less complex, and smaller than comparable liquid-fueled internal combustion motors typically used to drive propeller assemblies on conventional craft.

In some examples, the electric motor(s) configured to drive the propeller assemblies 116 are controlled by an electronic speed controller and powered by an onboard battery system (e.g., a lithium-ion system, magnesium-ion system, lithium-sulfur system, etc.). In some examples, the electric motor(s) configured to drive the propeller assemblies 116 are powered by a fuel cell or a centralized liquid-fueled electricity generator.

In some examples where electric motors are configured to drive the propeller assemblies 116, the electric motors are powered by an onboard electrical supply system that includes multiple systems for supplying power to the electric motors driving the propeller assemblies 116 during different operational modes, such as a first battery system configured to deliver large amounts of power during takeoff and a second system with a higher energy density but lower peak power capability for delivering sustained lower power during cruise operation (e.g., during hydrofoil waterborne operation or during wing-borne operation, each of which are described in further detail below).

In some embodiments, some of the propeller assemblies 116 are driven by electric motors, and some of the propeller assemblies 116 are driven by internal combustion motors. In some embodiments, some of the propeller assemblies 116 may be additionally or alternatively driven by a hybrid motor that include both an internal combustion motor and an electric motor.

In some embodiments where at least some of the propeller assemblies 116 are driven by one or more internal combustion motors, the internal combustion motors may be any type of internal combustion motor now known or later developed that is suitable for driving the propeller assemblies 116. For example, the internal combustion motor(s) may be any of a turboprop, an inline engine, an opposed or O-type engine, a V-type engine, a radial engine, a gas turbine, a reciprocating piston motor, a rotary motor, a two or four cycle motor, a spark ignition or compression motor, or any other type of suitable internal combustion engine. The particular type of internal combustion motor(s) employed may be based on several tradeoffs, such as the types of fuel used by the different types of engines, heat dissipation concerns (e.g., reciprocating engines may dissipate less heat than a turboprop), types of cooling available (e.g., reciprocating engines can be liquid cooled whereas turboprop engines are air cooled), size constraints (e.g., reciprocating engines may be smaller than turboprops), power requirements (e.g., turboprop engines tend to generate more power than piston engines), performance at different altitudes (e.g., turboprops tend to be more efficient at higher altitudes than piston engines), and so on.

In some embodiments where at least some of the propeller assemblies 116 are driven by one or more electric motors, the electric motors may be any type of electric motor now known or later developed that is suitable for driving the propeller assemblies 116. For example, the electric motor(s) may be any of a permanent magnet synchronous motor (PMSM), induction motor, switched reluctance motor, direct current (DC) series motor, three phase alternating current (AC) induction motor, or any other type of suitable electric motor.

In some embodiments where at least some of the propellers assemblies 116 are driven by one or more electric motors, the electric motors may be powered by any type of power source suitable for powering an electric motor for driving the propeller assemblies 116. For example, in some embodiments, the electric motors may be powered by a battery system, e.g., as battery system 400 shown and described with reference to FIG. 4.

In some embodiments where at least some of the propeller assemblies 116 are driven by one or more hybrid motors, the hybrid motors may be any type of hybrid motor now known or later developed that is suitable for driving the propeller assemblies 116. As mentioned above, hybrid motors include both an internal combustion motor and an electric motor. In some embodiments that include one or more hybrid motors, one or more internal combustion motors are configured to charge one or more battery systems, and the one or more battery systems are configured to power one or more electric motors that are arranged to drive the propeller assemblies 116.

In some embodiments, the electric motor of the hybrid motor may be any type of electric motor suitable for driving the propeller assemblies 116, including but not limited to any of the electric motor configurations disclosed herein. Further, the internal combustion motor of the hybrid motor may be any type of internal combustion motor suitable for charging the one or more battery systems configured to power the one or more electric motors, including but not limited to any of the internal combustion motor configurations disclosed herein.

In some example configurations that employ several hybrid motors, each hybrid motor includes a single internal combustion motor configured to charge a single battery system that is arranged to power a single electric motor configured to drive one of the propeller assemblies. In such configurations, there is a one-to-one relationship between an internal combustion engine, a battery system, and an electric motor that drives a propeller assembly. For example, some such configurations include a first hybrid motor configured to charge a first battery system that powers a first electric motor configured to drive a first propeller assembly, a second hybrid motor configured to charge a second battery system that powers a second electric motor configured to drive a second propeller assembly, perhaps a third hybrid motor configured to charge a third battery system that powers a third electric motor configured to drive a third propeller assembly, and so on.

Some example configurations employ several hybrid motors, where each hybrid motor includes a single internal combustion motor configured to charge a battery system that is arranged to power a set of two or more electric motors configured to drive a corresponding set of two or more propeller assemblies. In such configurations, there is a one-to-one relationship between an internal combustion motor and a battery system. However, there is a one-to-many relationship between each battery system and the two or more electric motors that are powered by the battery system. For example, some such configurations include (i) a first hybrid motor with a first internal combustion motor configured to charge a first battery system that powers (a) a first electric motor configured to drive a first propeller assembly, (b) a second electric motor configured to drive a second propeller assembly, and (c) perhaps additional electric motors configured to drive additional propeller assemblies, and (ii) a second hybrid motor with a second internal combustion motor configured to charge a second battery system that powers (a) a third electric motor configured to drive a third propeller assembly, (b) a fourth electric motor configured to drive a fourth propeller assembly, and (c) perhaps additional electric motors configured to drive additional propeller assemblies.

Further, some example configurations employ a hybrid motor configuration where two or more internal combustion motors are configured to charge a common battery system that is arranged to power a set of two or more electric motors configured to drive a corresponding set of two or more propeller assemblies. In such configurations, there is a many-to-one relationship between the internal combustion motors and the common battery system, and there is a one-to-many relationship between the common battery system and the two or more electric motors that are powered by the common battery system. For example, in some such configurations, a first internal combustion motor and a second internal combustion motor are configured to charge a common battery system that powers (i) a first electric motor configured to drive a first propeller assembly, (ii) a second electric motor configured to drive a second propeller assembly, (iii) a third electric motor configured to drive a third propeller assembly, (iv) a fourth electric motor configured to drive a fourth propeller assembly, and so on.

In some embodiments with a hybrid motor configuration, the hybrid motor configuration includes one or more internal combustion motors that are configured to both (i) drive one or more propellers and (ii) charge one or more battery systems. For example, the internal combustion motor of the hybrid motor configuration can be configured to drive a propeller assembly during some modes of operation of the craft 100. And in other modes of operation, the internal combustion motor can be disengaged from driving the propeller assembly and may instead charge one or more battery systems. In some configurations, the internal combustion motor can drive a propeller assembly and charge one or more battery systems at the same time.

In some embodiments where the craft includes a combination of electric motors, internal combustion motors, and/or hybrid motors, the different motors can be sized based on several factors.

For example, the power-generating capacity of the internal combustion motors (e.g., either standalone internal combustion motors or internal combustion motor components of a hybrid motor) may be based on an amount of power desired (or required) for cruising at a particular speed and altitude in an "internal combustion propulsion" mode or "hybrid propulsion" mode (described below). In some instances, the internal combustion motors may be sized based on both (i) the power desired (or required) for cruising at a particular speed and altitude and (ii) excess power for additionally charging one or more battery supplies.

Similarly, the power-generating capacity of the electric motors (e.g., either standalone electric motors or electric motor components of a hybrid motor) may be based on an amount of power desired (or required) for cruising at a particular speed and altitude in an "electric propulsion" mode or "hybrid propulsion" mode (described below). In some instances, the electric motors may be sized based on both (i) the power desired (or required) for takeoff, hull borne operation, and/or foil borne operation and (ii) excess power in case there is a failure of one or more internal combustion engines.

In some embodiments where the craft includes a combination of electric motors, internal combustion motors, and/or hybrid motors, the placement/location of the different motors and their related components may also be based on several factors.

For example, placement of internal combustion motors and fuel tanks for the internal combustion motors (i.e., standalone internal combustion motors and/or internal combustion motor components of a hybrid motor) and/or placement of the electric motors and their corresponding battery systems (i.e., standalone electric motors and/or electric motor components of a hybrid motor) may be based on the size of the motors, thermal objectives (i.e., internal combustion motors tend to generate more heat than electric motors), safety, serviceability, the total number of motors, and so on.

For example, some embodiments may include a single internal combustion motor that is configured to charge one or more battery systems arranged to power a set of electric motors, where the electric motors are configured to drive the propeller assemblies that provide thrust for the craft. Some embodiments may include two internal combustion motors (e.g., a primary and a backup) that are configured to charge one or more battery systems arranged to power a set of electric motors, where the electric motors are configured to drive the propeller assemblies that provide thrust for the craft.

In some such embodiments, the internal combustion motor(s) may be located in the "belly" of the craft with the one or more battery systems. A configuration where the internal combustion motor(s) share the "belly" of the craft with the one or more battery systems for the electric motors may be advantageous in configurations where the belly of the craft tends to have space to accommodate both the internal combustion motor(s) and the battery systems. Additionally, co-locating the internal combustion motor(s) with the battery systems enables the same thermal insulation to be used for both the internal combustion motor(s) and the battery systems. In some such configurations, exhaust for the internal combustion engine(s) can be routed to the top of the craft.

In some configurations, the internal combustion motor(s) may be located in pods under or on top of the wings. Positioning the internal combustion motor(s) on or under the wings tends to move the center of gravity higher as compared to configurations where the internal combustion motor(s) are located in the belly of the craft. The under wing or over wing configurations are advantageous in configurations with even numbers of internal combustion engines (e.g., 2, 4, etc.) In some configurations, the internal combustion motor(s) may be located at the top of the spline of the craft, which can be advantageous in configurations with a single internal combustion motor.

Liquid fuel for the internal combustion motor(s) can be stored in several locations, including but not limited to pods under or on top of the wings, in the "belly" of the craft, in outriggers on the wing tips, or in reservoirs located elsewhere on or within the craft.

In some examples, the positioning of the propeller assemblies 116 along the leading edge of the main wing 104 is determined based on a variety of factors including, but not limited to, (i) the required total thrust for all modes of operation of the craft 100, (ii) the thrust generated by each individual propeller of the propeller assemblies 116, (iii) the radius of each propeller in the respective propeller assemblies 116, (iv) the required tip clearance between each propeller and the surface of the water, and (v) the additional freestream speed over the main wing 104 required for operation.

As shown in the figures, in some examples, the number of propeller assemblies 116 is symmetrical across both sides of the hull 102. In some examples, the propeller assemblies 116 are identical. In some examples, the propeller assemblies 116 have different propeller radii or blade configurations along the span so long as the configuration is symmetrical across the hull 102. The different radii facilitate adequate propeller tip clearance from the water or vehicle structure. In some examples, the different propellers are optimized for different operational conditions, such as wing-borne cruise. The propeller placement and configuration may vary to increase the airflow over the main wing 104 or tail system 106 to improve controllability or stability. While eight total propeller assemblies 116 are illustrated, the actual number of propeller assemblies 116 can vary based on the requirements of the craft 100.

In some examples, the propeller assemblies 116 have different pitch settings or variable pitch capabilities based on their position on the main wing 104. For instance, in some examples, a subset of the propeller assemblies 116 have fixed-pitch propellers sized for cruise speeds, while the remainder of the propeller assemblies 116 have fixed-pitch propellers configured for takeoff or can allow for varying the propeller's pitch.

In some examples, different propeller assemblies 116 are turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the craft 100, allowing the craft 100 to turn without large bank angles and increasing the turning maneuverability of the craft 100. For instance, in order to yaw right, the craft 100 may increase the rotational speeds of the propellers of one or more of propeller assemblies 116g-1 while decreasing the rotational speeds of the propellers of one or more of propeller assemblies 116a-f. Similarly, to yaw left, the craft 100 may increase the rotational speeds of the propellers of one or more of propeller assemblies 116a-f while decreasing the rotational speeds of the propellers of one or more of propeller assemblies 116g-l.

Similarly varying rotational speeds or propeller pitches may be used to yaw or roll the aircraft in flight or while foiling due to varied forces and lift distributions imposed over the wing and its control surfaces or in general used to tailor the lift distribution across the wing for optimized efficiency.

In some examples, the propeller assemblies may tilt to vector thrust either to provide directly more vertical lift or to change how the wing is blown depending on the mode of operation so as to tailor the blown lift distribution.

Some examples of the main wing 104 include one or more aerodynamic control surfaces, such as flaps 118 and ailerons 120. Some examples of these controls comprise movable hinged surfaces on the trailing or leading edges of the main wing 104 for changing the aerodynamic shape of the main wing 104. Some examples of the flaps 118 are configured to extend downward below the main wing 104 to reduce stall speed and create additional lift at low airspeeds, while some examples of the ailerons 120 are configured to extend upward above the main wing 104 to decrease lift on one side of the main wing 104 and induce a roll moment in the craft 100. In some examples, the ailerons 120 are additionally configured to extend downward below the main wing 104 in a flaperon configuration to help the flaps 118 generate additional lift on the main wing 104, which, in some examples, is used to either create a rolling moment or additional balanced lift depending on coordinated movement of both ailerons. Some examples of the flaps 118 and ailerons 120 include one or more actuators for raising and lowering the flaps 118 and ailerons 120. Within examples, the flaps 118 include one or more of plain flaps, split flaps, slotted flaps, Fowler flaps, slotted Fowler flaps, Gouge flaps, Junkers flaps, or Zap flaps. Further, in some examples, the flaps 118 (and the ailerons 120 when configured as flaperons) are positioned to be in the wake of one or more of the propeller assemblies 116. In some examples, the ailerons 120 are positioned so that they are in the wake of one or more of the propeller assemblies 116 to increase the effectiveness of the ailerons at low forward velocities. Some of the propeller assemblies 116 are positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

C. Tail System

As illustrated in FIGS. 1A-1D, some examples of the tail 106 include a vertical stabilizer 122, a horizontal stabilizer 124, and one or more control surfaces, such as elevators 126. Similar to the flaps 118 and ailerons 120, some examples of the elevators 126 comprise movable hinged surfaces on the trailing or leading edges of the horizontal stabilizer 124 for changing the aerodynamic shape of the horizontal stabilizer 124 to control a pitch of the craft 100. Some examples of the horizontal stabilizer 124 are combined with the elevator 126, creating a fully articulating horizontal stabilizer (e.g., a stabilator). Raising the elevator 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. Some examples of the elevators 126 include actuators, which are operated by a control system of the craft 100 to raise and lower the elevators 126.

As illustrated in FIGS. 1A-ID, some examples of tail 106 include a rudder 128. Some examples of the rudder 128 comprise a movable hinged surface on the trailing edge of the vertical stabilizer 122 for changing the aerodynamic shape of the vertical stabilizer 122 to control the yaw of the craft 100 when operating in an airborne mode. In some examples, the rudder 128 additionally changes a hydrodynamic shape of the hull 102 to control the yaw of the craft 100 when operating in a waterborne mode. To facilitate such hydrodynamic control, in some examples, the rudder 128 is positioned low enough on the tail 106 that the rudder 128 is partially or entirely submerged when the hull 102 is floating in water. For instance, the rudder 128 is positioned partially or entirely below the waterline of the hull 102. Some examples of the rudder 128 include one or more actuators, which are operated by a control system of the craft 100 to rotate the hinged surface of the rudder 128 to the left or right of the vertical stabilizer 122. Actuating the rudder 128 to the left (relative to the direction of travel) causes the craft 100 to yaw left. Actuating the rudder 128 to the right (relative to the direction of travel) causes the craft 100 to yaw right. As such, the rudder 128 may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

Some examples of the tail 106 include one or more vertical stabilizers 122a, 122b, 122n, one or more horizontal stabilizers 124a, 124b, one or more control surfaces, such as elevators 126, and one or more tail flaps 127 for enhanced pitch control configured to exert enhanced net downward force on the tail system. It should be understood that although the figures show only two horizontal stabilizers, it is contemplated that more than two of each can be used within the scope of the present teachings. In some applications, it has been found that the transition from waterborne operation to airborne or wing-borne operation can require a larger pitching moment to overcome the larger drag forces existing between the hull 102 and/or the hydrofoil assemblies 108, 110 and the water. This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the craft 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124a and a second horizontal stabilizer 124b. It should be understood that one or more additional horizontal stabilizers can be used.

In some examples, a first horizontal stabilizer 124a is a lower horizontal stabilizer relative to a second horizontal stabilizer 124b. However, it should be appreciated that the horizontal stabilizers in some examples can be interchanged for performance purposes (e.g., the disclosed structure of the first horizontal stabilizer 124a can be incorporated in the upper horizontal stabilizer and the disclosed structure of the second horizontal stabilizer 124b can be incorporated in the lower horizontal stabilizer). In some non-limiting examples, the structure, shape, and/or performance of each horizontal stabilizer can be tailored as desired such that the lower horizontal stabilizer (in this example, the first horizontal stabilizer 124a) is more likely to experience aerodynamic effect from being in the wake of the blown-wing propulsion system disclosed herein or associated wake produced by alternative propulsion systems. In this way, greater aerodynamic control and/or downwards lift can be generated during desired phases of operation.

Some examples of the horizontal stabilizers 124a, 124b include one or more aerodynamic control surfaces, such as tail flaps 127 and elevators 126, which may comprise movable hinged surfaces on the trailing or leading edges of the horizontal stabilizer 124a, 124b for changing the aerodynamic shape of the respective horizontal stabilizer 124a, 124b. It should be recognized that at least one of the horizontal stabilizers 124a, 124b can be sized, shaped, and/or spaced relative to a second of the horizontal stabilizers 124a, 124b to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124a, 124b can be actuated in an opposing direction. In some embodiments, at least one of the horizontal stabilizers 124a, 124b can define a ratio of a surface area of the first horizontal stabilizer to a surface area of the second horizontal stabilizer in the range of 0.9 to 1.6. In some non-limiting example configurations, the surface area of the first horizontal stabilizer is 5.7 m$^2$, the surface area of the second horizontal stabilizer is 3.9 m$^2$, both have a chord of about 1 m and a vertical separation of 1.8 m. In some embodiments, a vertical separation distance between the first horizontal stabilizer and the second horizontal stabilizer is in the range of 0.25 to 0.75 of the lower horizontal stabilizer span. In some examples, a vertical separation distance can be dependent on the required rudder authority and thus elevator size (driven by, e.g., yaw stability, or the need to counteract asymmetric thrust following powerplant failure). In some examples, a sweep offset moves the center of pressure further aft from the center of gravity, thus allowing the airfoil of the horizontal stabilizer to have less surface area overall, thus being smaller and lighter. In some examples, a dihedral in the bottom surface of the horizontal stabilizer adds stability. In some examples, the box tail design itself increases the efficiency due to the elimination of wingtip vortices of a typical tail. In some embodiments, a lower horizontal stabilizer may have approximately a 15% thickness-to-chord ratio to support the weight of the upper components, whereas the vertical and upper surfaces may be thinner, such as, for example, 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128*a*, 128*b*, 128*n* can change the pressure distribution across the elevator 126, for example, commanding a left 5 degree deflection in the left vertical control surface may move the mean pressure distribution left/right by a percentage of the elevator width.

Some examples of the tail flaps 127 are configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at 1 h the horizontal stabilizer 124 becomes aerodynamically effective by creating additional net downward force at low airspeeds to aid in exerting a nose-up pitching moment of the craft 100. The elevators 126 may be configured for changing the aerodynamic shape of the horizontal stabilizer 124 to further control or vary a pitch of the craft 100.

In some examples operations, the tail flaps 127 are deployed for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed for other phases of operation, such as hull-borne mode, to reduce downforce on the tail system and reduce drag.

In some examples, the elevators 126 are additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122*a*, 122*b*, 122*n*, which can reduce complex hinge systems or external arms, thereby reducing wetted area and excrescences drag), an electric servo motor mounting within the vertical stabilizers 122*a*, 122*b*, 122*n* and/or horizontal stabilizers 124*a*, 124*b*, and/or a central vertical strut system generally mounted in the hull 102 or the fuselage of the craft 100 (to provide the potential for reduced cross-sectional area and associated drag).

Further, in some examples, the elevators 126 and/or the tail flaps 127 are positioned so that they are in the wake 129 of one or more of the propeller assemblies 116 of main wing 104. The elevators 126 and/or the tail flaps 127 may be positioned so that they are in the wake 129 of one or more of the propeller assemblies 116 to increase the effectiveness of the elevators at low forward velocities. In some examples, the propeller assemblies 116 are positioned so that no elevators 126 or tail flaps 127 are in the wake 129 to ensure consistent and/or predictable aerodynamic forces, independent of power application, are exerted during critical operational phases. In some examples, the propeller assemblies 116 are positioned so that the elevators 126 are in their wake 129 and the tail flaps 127 are not in the wake 129 (e.g., above the wake 129) and are exposed to clean air 131. It should be understood that positioning of the tail flaps 127 in the second horizontal stabilizer 124*b*, or at a distance above the center of gravity of the craft 100, will have the added unexpected benefit of creating additional nose-up pitching moment as a result of induced drag acting about the center of gravity causing the craft 100 to pitch upward.

Similar to the flaps 118 and the ailerons 120 of the main wing 104, some examples of the elevators 126 comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 in order to raise and lower the elevators 126.

In some examples, the tail 106 includes one or more rudders 128*a*, 128*b*, 128*n*. The rudders 128*a*, 128*b*, 128*n* may each comprise a movable hinged surface on the trailing edge of the corresponding vertical stabilizers 122*a*, 122*b*, 122*n* for changing the aerodynamic shape of the vertical stabilizer 122 to control the yaw of the craft 100 when operating in an airborne mode. It should be understood that rudders 128*a*, 128*b*, 128*n* can operate independently or in combination as desired. Moreover, in some examples, rudders 128*a*, 128*b*, 128*n* can be used as redundant systems, particularly useful in the event of one or more failures.

In some examples, the rudders 128*a*, 128*b*, 128*n* additionally change a hydrodynamic shape of the hull 102 to control the yaw of the craft 100 when operating in a waterborne mode. In order to facilitate such hydrodynamic control, the rudders 128*a*, 128*b*, 128*n* may be positioned low enough on the tail 106 that one or more of the rudders 128*a*, 128*b*, 128*n* is partially or entirely submerged when the hull 102 is floating in water. Namely, the rudders 128*a*, 128*b*, 128*n* may be positioned partially or entirely below a waterline of the hull 102. The rudders 128*a*, 128*b*, 128*n* may include one or more actuators, which may be operated by a control system of the craft 100 in order to rotate the hinged surface of the rudders 128*a*, 128*b*, 128*n* to the left or right of the vertical stabilizer 122. Actuating the rudders 128*a*, 128*b*, 128*n* to the left (relative to the direction of travel) causes the craft 100 to yaw left. Actuating the rudders 128*a*, 128*b*, 128*n* to the right (relative to the direction of travel) causes the craft 100 to yaw right. As such, the rudders 128*a*, 128*b*, 128*n* may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

It should be understood that the fundamental shape of tail 106, having one or more vertical stabilizers 122*a*, 122*b*, 122*n* and one or more horizontal stabilizers 124*a*, 124*b*, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

Some examples of the craft 100 include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the craft 100 at lower travel speeds. When determining the number and size of propeller assemblies to include on the tail 106, one may apply the same factors described above when determining the number and size of propeller assemblies to include on the main wing 104.

D. Hydrofoil Systems

As noted above, some examples of the craft 100 include a main hydrofoil assembly 108 and a rear hydrofoil assembly 110. In some examples, the main hydrofoil assembly 108 is positioned proximate to the middle or bow of the craft 100, and the rear hydrofoil assembly 110 is positioned proximate to the stem. For instance, some examples of the main hydrofoil assembly 108 is positioned between the bow and a midpoint (between the bow and stern) of the craft 100, and some examples of the rear hydrofoil assembly 110 is positioned below the tail 106 of the craft 100.

The main hydrofoil assembly 108 and the rear hydrofoil assembly 110 are configured to facilitate the breaking of contact between the hull of the craft and the water surface during takeoff, which, as noted above, can otherwise be challenging in some conventional craft designs. Some examples of the main hydrofoil assembly 108 and the rear hydrofoil assembly 110 are configured to be retractable, large enough to lift the entire craft out of the water and not impact the water surface, and to enable sustained operation in the hydrofoil-borne mode (where the entire weight of the craft is supported by the one or more hydrofoil assemblies).

Some examples of the main hydrofoil assembly 108 include a main hydrofoil 130, one or more main hydrofoil struts 132 that couple the main hydrofoil 130 to the hull 102, and one or more main hydrofoil control surfaces 134. Similarly, some examples of the rear hydrofoil assembly 110 include a rear hydrofoil 136, one or more rear hydrofoil struts 138 that couple the rear hydrofoil 136 to the hull 102, and one or more rear hydrofoil control surfaces 140.

Some examples of the main hydrofoil 130 and the rear hydrofoil 136 take the form of one or more hydrodynamic lifting surfaces (also referred to as "foils") configured to be operated partially or entirely submerged underwater while the hull 102 of the craft 100 remains above and clear of the water's surface. In operation, as the craft 100 moves through water with the main hydrofoil 130 and the rear hydrofoil 136 submerged, the hydrofoils generate a lifting force that causes the hull 102 to rise above the surface of the water. In general, the lifting force generated by the hydrofoils must be at least equal to the weight of the craft 100 to cause the hull 102 to rise above the surface of the water. The lifting force of the hydrofoils depends on the speed and angle of attack at which the hydrofoils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main hydrofoil struts 132 that couple the main hydrofoil 130 to the hull 102 and the length of the one or more rear hydrofoil struts 138 that couple the rear hydrofoil 136 to the hull 102. In some examples, the main hydrofoil strut 132 and the rear hydrofoil strut 138 are long enough to lift the hull 102 at least five feet above the surface of the water during hydrofoil-borne operation, which facilitates operation in substantially choppy waters. Struts of other lengths may be used as well. For instance, in some examples, longer struts that allow for better wave-isolation of the hull 102 (but at the expense of the stability of the craft 100 and increasing complexity of the retraction system) are utilized.

In practice, hydrofoils have a limited top speed before cavitation occurs, which results in vapor bubbles forming and imploding on the surface of the hydrofoil. Cavitation not only may cause damage to a hydrofoil but also significantly reduces the amount of lift generated by the hydrofoil and increases drag. Therefore, it is desirable to reduce the onset of cavitation by designing the main hydrofoil 130 and the rear hydrofoil 136 in a way that allows the hydrofoils to operate at higher speeds (e.g., ~20-45 mph) and across the entire required hydrofoil-borne speed envelope before cavitation occurs. For instance, in some examples, the onset of cavitation is controlled based on the geometric design of the main hydrofoil 130 and the rear hydrofoil 136. Additionally, in some examples, the structural design of the main hydrofoil 130 and the rear hydrofoil 136 is configured to allow the surfaces of the hydrofoils to flex and twist at higher speeds, which may reduce loading on the hydrofoils and delay the onset of cavitation.

Further, in some examples, the distributed blown-wing propulsion system described above further facilitates the delay of onset of cavitation on the main hydrofoil 130 and the rear hydrofoil 136. Cavitation is caused by both (i) the amount of lift generated by a hydrofoil and (ii) the profile of the hydrofoil (which is affected by both the hydrofoil's angle of attack and its vertical thickness) as it moves through water. Reducing the amount of lift generated by the hydrofoil delays the onset of cavitation. Because the blown-wing propulsion system creates additional lift on the main wing 104, the amount of lift exerted on the main hydrofoil 130 and the rear hydrofoil 136 to lift the hull 102 out of the water is reduced. Further, because the main hydrofoil 130 and the rear hydrofoil 136 do not need to generate as much lift to raise the hull 102 out of the water, their angles of attack may be reduced as well, which further delays the onset of cavitation. In some examples, combining the blown-wing propulsion system with the hydrofoil designs described herein facilitates operating the craft 100 in a hydrofoil-borne mode at speeds above 35 knots before cavitation occurs.

As noted above, some examples of the main hydrofoil assembly 108 and the rear hydrofoil assembly 110 include one or more main and rear hydrofoil control surfaces 134, 140, respectively. Some examples of the main hydrofoil control surfaces 134 include one or more hinged surfaces on a trailing or leading edge of the main hydrofoil 130 as well as one or more actuators which are operated by the control system of the craft 100 to rotate the hinged surfaces so that they extend above or below the main hydrofoil 130. Some examples of the main hydrofoil control surfaces 134 on the main hydrofoil 130 are operated in a similar manner as the flaps 118 and ailerons 120 on the main wing 104 of the craft 100. In some examples, lowering the control surfaces 134 to extend below the main hydrofoil 130 changes the hydrodynamic shape of the main hydrofoil 130 in a manner that generates additional lift on the main hydrofoil 130, similar to the aerodynamic effect of lowering the flaps 118. In some examples, asymmetrically raising one or more of the control surfaces 134 (e.g., raising a control surface 134 on only one side of the main hydrofoil 130) changes the hydrodynamic shape of the main hydrofoil 130 in a manner that generates a roll force on the main hydrofoil 130, similar to the aerodynamic effect of raising one of the ailerons 120.

Likewise, some examples of the rear hydrofoil control surfaces 140 include one or more hinged surfaces on a trailing or leading edge of the rear hydrofoil 136 as well as one or more actuators, which are operated by the control system of the craft 100 to rotate the hinged surfaces so that they extend above or below the rear hydrofoil 136. In some examples, the rear hydrofoil control surfaces 140 on the rear hydrofoil 136 are operated in a similar manner as the elevators 126 on the tail 106 of the craft 100. In some examples, lowering the control surfaces 140 to extend below the rear hydrofoil 136 changes the hydrodynamic shape of the rear hydrofoil 136 in a manner that causes the craft 100 to pitch downwards, similar to the aerodynamic effect of lowering the elevators 126. In some examples, raising the control surfaces 140 to extend above the rear hydrofoil 136 changes a hydrodynamic shape of the rear hydrofoil 136 in a manner that causes the craft 100 to pitch upwards, similar to the aerodynamic effect of raising the elevators 126.

In some examples, one or both of the main hydrofoil control surfaces 134 or the rear hydrofoil control surfaces 140 include rudder-like control surfaces similar to the rudder 128 on the tail 106 of the craft 100. For instance, some examples of the main hydrofoil control surfaces 134 include one or more hinged surfaces on a trailing edge of the main hydrofoil strut 132 as well as one or more actuators, which are operated by the control system of the craft 100 to rotate the hinged surfaces so that they extend to the left or right of the main hydrofoil strut 132. Similarly, some examples of the rear hydrofoil control surfaces 140 include one or more hinged surfaces on a trailing edge of the rear hydrofoil strut 138 as well as one or more actuators, which are operated by the control system of the craft 100 in order to rotate the hinged surfaces so that they extend to the left or right of the rear hydrofoil strut 138. In some examples, actuating the main hydrofoil control surfaces 134 or the rear hydrofoil control surfaces 140 in this manner changes the hydrodynamic shape of the main hydrofoil strut 132 or the rear hydrofoil strut 138, respectively, which facilitates controlling the yaw of the craft 100 when operating in a waterborne or hydrofoil-borne mode, similar to the effect of actuating the rudder 128 of the craft 100, as described above.

In some examples, instead of (or in addition to) actuating hinged control surfaces on the main hydrofoil 130 and/or the rear hydrofoil 136, a control system of the craft 100 actuates the entire main hydrofoil 130 and/or the entire rear hydrofoil 136 themselves. In some examples, the craft 100 includes one or more actuators for rotating the main hydrofoil 130 and/or the rear hydrofoil 136 around the yaw axis. In some examples, the craft 100 includes one or more actuators for controlling the angle of attack of the main hydrofoil 130 and/or the rear hydrofoil 136 (i.e., rotating the main hydrofoil 130 and/or the rear hydrofoil 136 around the pitch axis). Some examples of the craft 100 include one or more actuators for rotating the main hydrofoil 130 and/or the rear hydrofoil 136 around the roll axis. Some examples of the craft 100 include one or more actuators for changing a camber or shape of the main hydrofoil 130 and/or the rear hydrofoil 136. Some examples of the craft 100 include one or more actuators for flapping the main hydrofoil 130 and/or the rear hydrofoil 136 to help propel the craft 100 forward or backward. Other examples are possible as well.

Further, some examples of the craft 100 dynamically control an extent to which the main hydrofoil 130 and/or the rear hydrofoil 136 are deployed based on an operational mode (e.g., hull-borne, hydrofoil-borne, or wing-borne modes) of the craft 100. For instance, in some examples, during hull-borne mode, the rear hydrofoil assembly 110 is partially deployed or retracted to increase turning authority. The amount of partial deployment or retraction may be a function of the desired overall vehicle draft when operating in a shallow water environment. In some examples, during hydrofoil-borne mode, the main hydrofoil assembly 108 is partially retracted to reduce the distance between the hull of the vehicle and the water's surface. This increases the amount of lift generated by the main wing 104 by operating the wing closer to the surface of the water, increasing the effects of the aerodynamic ground effect.

As noted above, some examples of the main hydrofoil assembly 108 and rear hydrofoil assembly 110 interface with a deployment system that facilitates retracting the respective hydrofoil assemblies 108, 110 into or toward the hull 102 for hull-borne or wing-borne operation and for extending the respective hydrofoil assemblies 108, 110 below the hull 102 for hydrofoil-borne operation. As described further below, in some embodiments, the deployment system is used in connection with extending, retracting, and/or otherwise controlling the positioning of the hydrofoil assemblies 108, 110 during takeoff when the craft is transitioning from hydrofoil-borne operation to wing-borne operation.

E. Hydrofoil Deployment Systems

Figure 2:
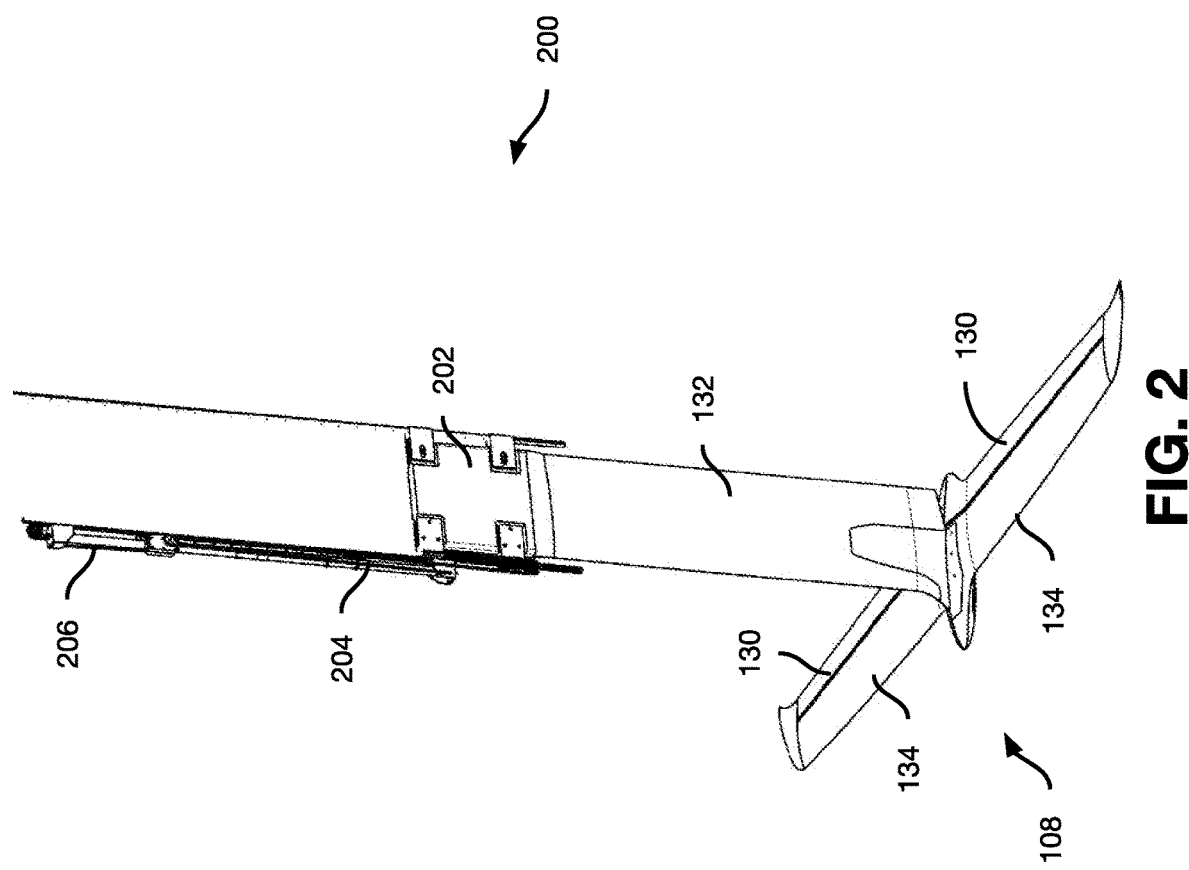
FIG. 2 illustrates a main hydrofoil deployment system of a craft, in accordance with example embodiments.

FIG. 2 illustrates an example of a main hydrofoil deployment system 200 that facilitates retracting and extending of the main hydrofoil assembly 108. As shown, some examples of the main hydrofoil deployment system 200 take the form of a linear actuator that includes one or more brackets 202 that couple the main hydrofoil assembly 108 (by way of the main hydrofoil strut 132) to one or more vertical tracks 204. Some examples of the brackets 202 are configured to move vertically along the tracks 204, such that when the brackets 202 move vertically along the tracks 204, the main hydrofoil assembly 108 likewise moves vertically. Some examples of the brackets 202 are coupled to a leadscrew 206 that, when rotated, causes vertical movement of the brackets 202. Some examples of the leadscrew 206 are rotatable by any of various sources of torque, such as an electric motor coupled to the leadscrew 206 by a gear assembly.

Some examples of the main hydrofoil deployment system 200 further include one or more sensors 210 configured to detect a vertical position of the main hydrofoil assembly 108. For example, a first sensor senses when the main hydrofoil assembly 108 has reached a fully retracted position and a second sensor senses when the main hydrofoil assembly 108 has reached a fully extended position. However, the main hydrofoil deployment system 200 may include additional sensors for detecting additional discrete positions or continuous positions of the main hydrofoil assembly 108. Some examples of the sensors are included as part of, or otherwise configured to communicate with, the control system of the craft 100 to provide the control system with data that indicates the position of the main hydrofoil assembly 108. Some examples of the control system use this data to determine whether to operate the electric motor to retract or extend the main hydrofoil assembly 108.

In some examples, such as examples where the linear actuator is not a self-locking linear actuator, the main hydrofoil deployment system 200 includes a locking or braking mechanism for holding the main hydrofoil strut 132 in a fixed position (e.g., in a fully retracted or fully extended position). An example of the locking mechanism corresponded to a dual-action mechanical brake that is coupled to the electric motor, the leadscrew 206, or the gear assembly.

While the above description provides various details of an example main hydrofoil deployment system 200, it should be understood that the main hydrofoil deployment system 200 illustrated in FIG. 2 is for illustrative purposes and is not meant to be limiting. For instance, the main hydrofoil deployment system 200 may include any of various linear actuators now known or later developed that are capable of retracting and extending the main hydrofoil assembly 108.

Figure 3:
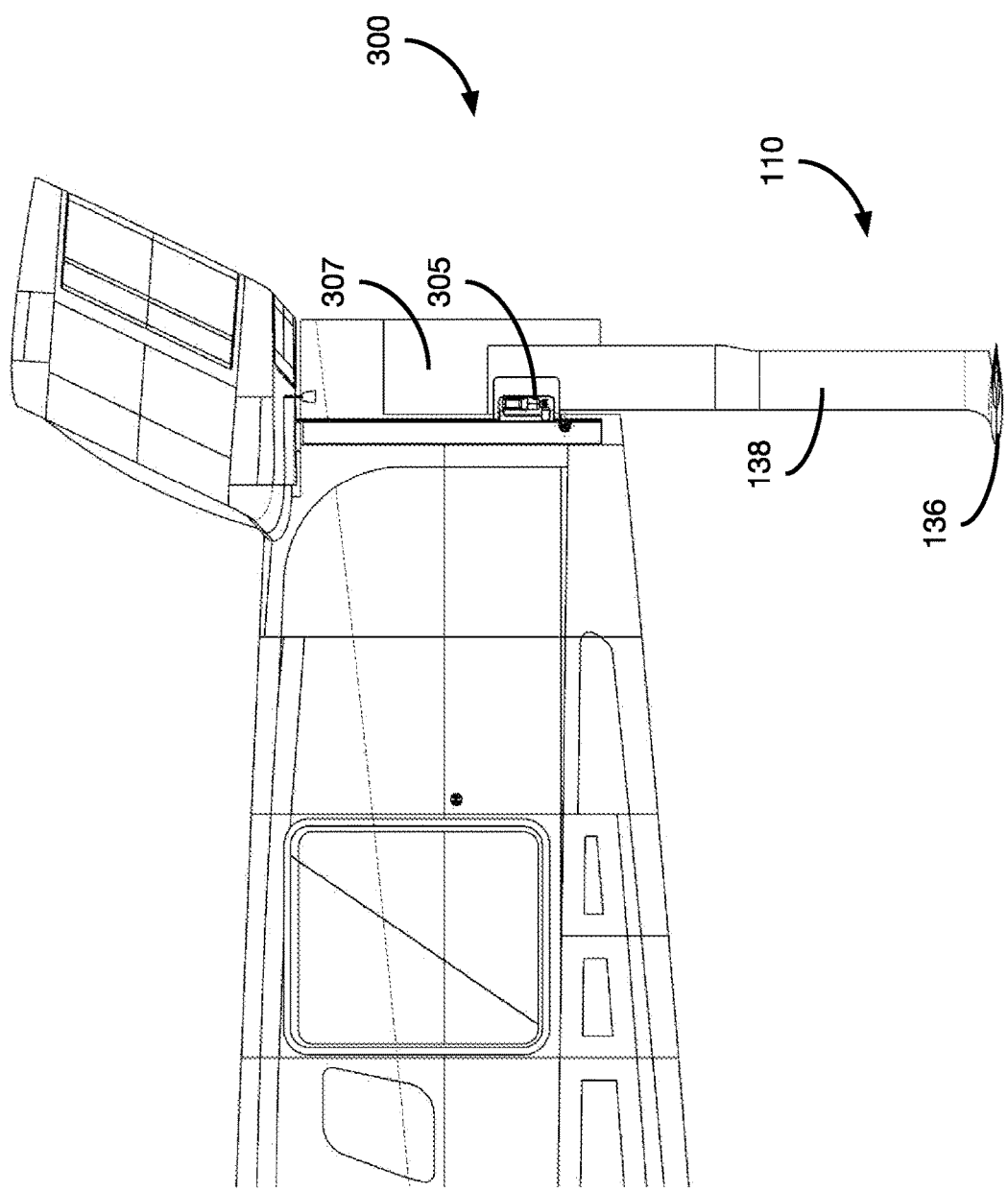
FIG. 3 illustrates a rear hydrofoil deployment system of a craft, in accordance with example embodiments.

FIG. 3 illustrates an example of a rear hydrofoil deployment system 300 that facilitates retracting and extending the rear hydrofoil 136. As shown, some examples of the rear hydrofoil deployment system 300 include an actuator 305 to the rear hydrofoil strut 138. When actuated, the actuator 305 causes the rear hydrofoil strut 138 to raise or lower by causing the rear hydrofoil strut 138 to slide vertically along a shaft 307. While not illustrated in FIG. 3, in some examples, the rudder 128 is mounted to the shaft 307 such that, when the actuator 305 raises the rear hydrofoil strut 138, the rear hydrofoil strut 138 retracts at least partially into the rudder 128. Additionally, some examples of the rear hydrofoil deployment system 300 include one or more servo motors configured to rotate the rear hydrofoil strut 138 around the shaft. In this respect, in some examples, the rear hydrofoil strut 138 is rotated around the shaft to act as a hydro-rudder when submerged in water or to act as an aero-rudder when out of the water. Further, because the rudder 128 is mounted to the same shaft 307 as the rear hydrofoil strut 138 and the rear hydrofoil strut 138 can be retracted into the rudder 128, the same servo motor can also be used to control the rotation of the rudder 128.

The actuator 305 of the rear hydrofoil deployment system 300 may take various forms and may, for instance, include any of various linear actuators now known or later developed that are capable of retracting and extending the rear hydrofoil assembly 110. Further, in some examples, the actuator 305 has a non-unitary actuation ratio such that a given movement of the actuator 305 causes a larger corresponding induced movement of the rear hydrofoil assembly 110. This can help allow for faster retractions of the rear hydrofoil assembly 110, which may be beneficial during takeoff, as described in further detail below.

Some examples of the main hydrofoil assembly 108 and/or the rear hydrofoil assembly 110 are configured such that, when fully retracted, the hydrofoil assembly is flush, conformal, or tangent to the hull 102. For instance, some examples of the hull 102 include one or more recesses configured to receive the main hydrofoil assembly 108 and/or the rear hydrofoil assembly 110. In this regard, some examples of the main hydrofoil assembly 108 and/or the rear hydrofoil assembly 110 have a shape such that when the main hydrofoil assembly 108 and/or the rear hydrofoil assembly 110 are fully retracted into the recesses of the hull 102, the outer contour of the hull 102 forms a substantially smooth transition at the intersection of the hull 102 and the main hydrofoil assembly 108 and/or the rear hydrofoil assembly 110.

Other examples of the main hydrofoil assembly 108 and/or the rear hydrofoil protrude slightly below the hull 102 when retracted. These examples of the main hydrofoil assembly 108 and/or the rear hydrofoil assembly 110 are configured to have a non-negligible effect on the aerodynamics of the craft 100. Some examples of the craft 100 are configured to leverage these effects to provide additional control of the craft 100. For instance, in some examples, when the main hydrofoil assembly 108 and/or the rear hydrofoil assembly 110 are retracted but still exposed, the exposed hydrofoil is manipulated in flight to impart forces and moments on the craft 100 similar to an aero-control surface.

Some examples of the hydrofoil assemblies 108, 110 disclosed herein are mounted on a pivot that is locked underwater but is unlocked to allow the hydrofoil to move around the pivot in the air. At that point, the control surfaces act like trim tabs and are able to effect movement of the entire unlocked, pivoting hydrofoil, which would otherwise require impractically large and heavy servo motors. This configuration facilitates unlocking and moving of the hydrofoil using a slow servo and/or a combination of control surface movement combined with forward movement through water, and then re-locked such that the hydrofoil is at a selected angle of incidence.

As noted above, some examples of the main hydrofoil assembly 108 are configured to be retractable. Some examples of the hull 102 include openings through which the strut 132 of the main hydrofoil assembly 108 are retracted and extended. Some examples of the hull 102 are configured to isolate water that enters through these openings (e.g., when the hull 102 contacts the water surface) and to allow for the water to drain from the hull 102 after the hull 102 is lifted out of the water. For instance, some examples of the hull 102 include pockets 142 on each side of the hull 102 aligned above the strut 132. Some examples of the pockets 142 are isolated from the remainder of the interior of the hull 102 so that water that accumulates in the pockets 142 does not reach any undesired areas (e.g., the cockpit, passenger seating area, areas that house the battery system 400, components of the control system of the craft 100, etc.). Further, some examples of the pockets 142 include venting holes or other openings located at or near the bottom of the pockets 142. The venting openings are configured to allow water that enters the pockets 142 to vent out of the pockets 142 when the hull 102 is lifted out of the water.

Some examples of the main hydrofoil assembly 108 and/or the rear hydrofoil assembly 110 include one or more propellers for additional propulsion when submerged underwater. For instance, in some examples, one or more propellers are mounted to the main hydrofoil 130 and/or the rear hydrofoil 136. In some examples, the propellers are configured to provide additional propulsion force to the craft 100 during hydrofoil-borne or hull-borne operation.

In some examples, propellers are mounted to the hull 102. The propellers are submerged during hull-borne operation. In some examples, the propellers are configured to provide additional propulsion force to the craft 100 during hull-borne operation.

Some examples of the main and/or rear hydrofoil assemblies 108, 110 include various failsafe mechanisms in case of malfunction. For instance, in some examples, when one or both of the main and rear hydrofoil deployment systems 200, 300 cannot be retracted due to a malfunction, the craft 100 is configured to jettison the malfunctioning assembly. In this regard, some examples of the main and/or rear hydrofoil assemblies 108, 110 are coupled to the hull 102 by a releasable latch. Some examples of the control system of the craft 100 are configured to identify a retraction malfunction (e.g., based on data received from the positional sensors 210) and responsively open the latch to release the connection between the hull 102 and the malfunctioning hydrofoil assembly. In some examples, the weight of the malfunctioning hydrofoil assembly is sufficient to jettison the malfunctioning hydrofoil assembly out of the hull 102 when the latch is opened. Some examples of the craft 100 include an actuator or some other mechanism to jettison the malfunctioning hydrofoil assembly out of the hull 102. In some examples, the main and/or rear hydrofoil assemblies 108, 110 are configured to break in a controlled manner upon impact with water. For instance, in some examples, a joint between the main hydrofoil strut 132 and the hull 102 and/or a joint between the rear hydrofoil strut 138 and the hull 102 is configured to disconnect when subjected to a torque significantly larger than standard operational torques at the joints. Other designs for providing controlled breaks are possible as well.

F. Battery System

Figure 4:
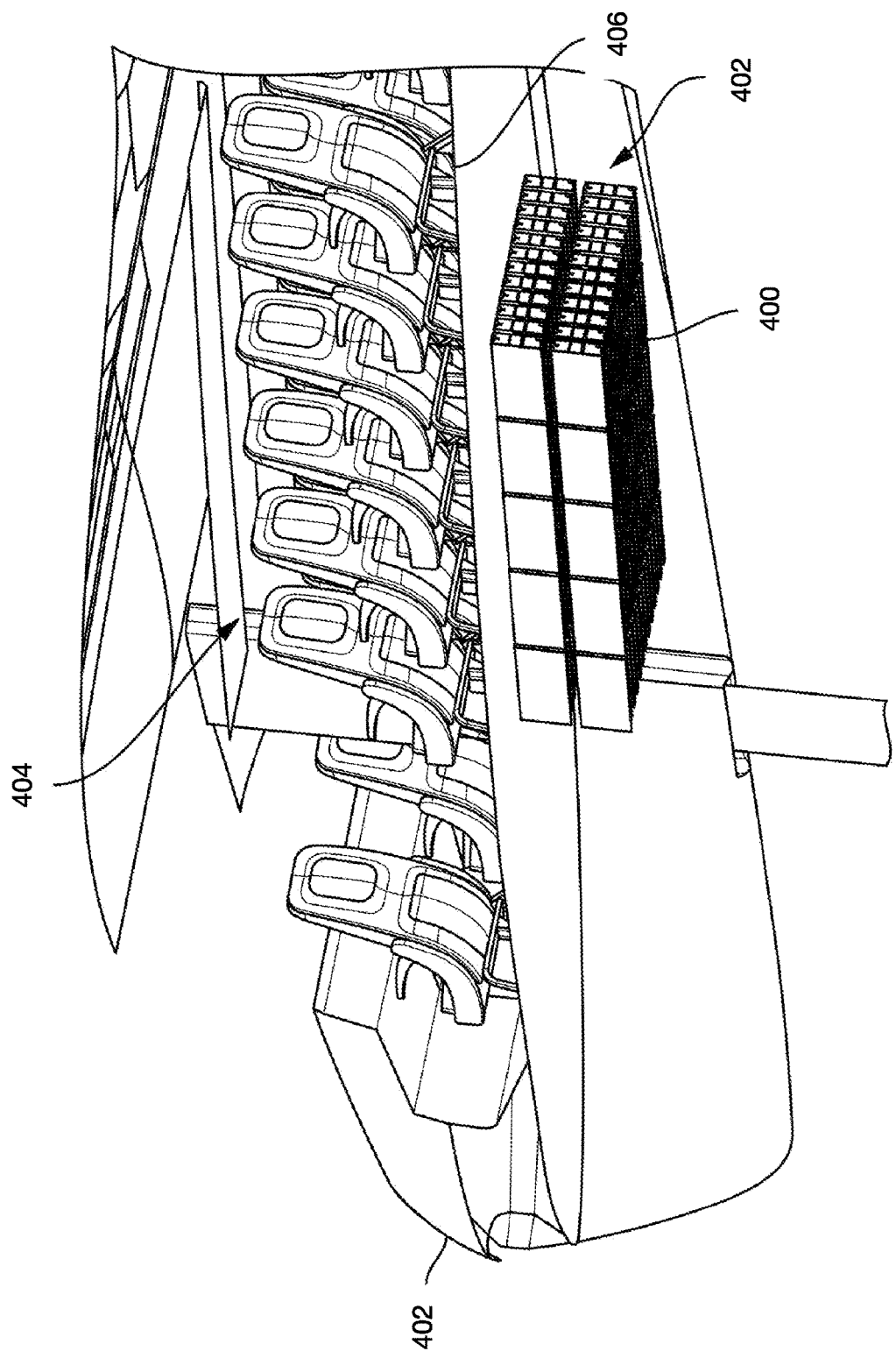
FIG. 4 illustrates a battery system of a craft, in accordance with example embodiments

FIG. 4 illustrates an example of an onboard battery system. In some examples, the battery system 400 is arranged in a protected area 402 of the hull 102 below a passenger seating area 404. Some examples of the battery system 400 are separated from the passenger seating area 404 by a firewall 406 to protect the passengers from harm if a thermal runaway occurs. In this regard, some examples of the craft 100 include a battery management system comprising voltage, current, and/or thermal sensors for detecting thermal runaway or some other fire detection system for detecting a fire in the protected area 402.

Some examples of the craft 100 include one or more mechanisms for flooding the battery system 400 (e.g., with an inert gas fire, with water, etc.) upon detecting a thermal runaway or a fire in the protected area 402. For instance, some examples of the hull 102 comprise one or more valves or other controllable openings. The control system of the craft 100 is configured to open the valves and/or controllable openings upon detecting a fire in the protected area 402 or thermal runaway in the battery system 400 to allow water to enter the protected area 402 and to extinguish or prevent a fire in the protected area 402.

In some examples, the battery system 400 is configured to be jettisoned through one or more of the controllable openings in the hull 102 described above. In this regard, in some examples, the weight of the battery system 400 is sufficient to jettison the battery system 400 out of the hull 102 when the hull 102 is opened. In some examples, the craft 100 comprises an actuator or the like configured to jettison the battery system 400 out of the hull 102.

In other examples, the craft 100 may take measures to become waterborne in response to detecting a fire in the protected area 402 or thermal runaway in the battery system 400. Some examples of the control system of the craft 100 determine a fire suppression operation to perform based on the operational state of the craft 100 (e.g., operating in hull-borne, hydrofoil-borne, or wing-borne mode). For instance, when operating in hull-borne mode and upon detecting a thermal runaway or a fire in the protected area 402, some examples of the control system are configured to flood the battery system 400 as described above. When operating in hydrofoil-borne or a wing-borne mode, the control system is configured to cause the craft 100 to transition to hull-borne mode upon detecting a thermal runaway or a fire in the protected area 402 and then flood the battery system 400.

As described above, the battery system 400 in some configurations may be charged by an internal combustion motor, including an internal combustion motor that is primarily used to drive one or more propeller assemblies and/or an internal combustion motor that is a component of a hybrid motor configuration. For example, in some embodiments that include hybrid motor configurations, one or more internal combustion motors are configured to charge the battery system 400, and the battery system 400 is configured to power one or more electric motors, where each electric motor is configured to drive a corresponding propeller assembly of the plurality of propeller assemblies 116 (FIGS. 1A-D). In some configurations, the internal combustion motor component of the hybrid motor configuration is arranged to both (i) drive one or more propeller assemblies, and/or (ii) charge one or more battery systems configured to power one or more electric motors that are configured to drive one or more propeller assemblies.

G. Control System

Figure 5:
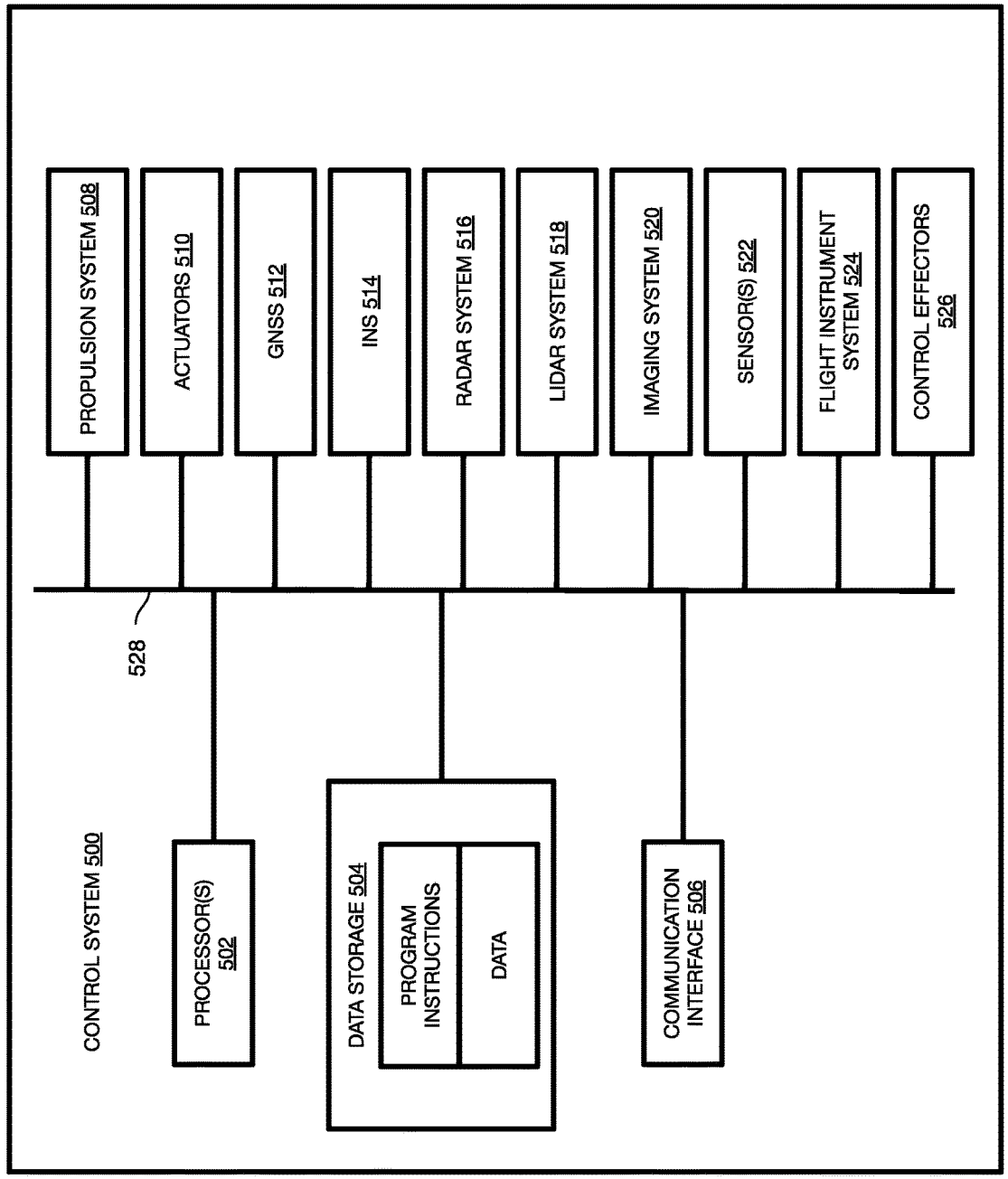
FIG. 5 illustrates a control system of a craft, in accordance with example embodiments.

FIG. 5 illustrates an example of a control system 500 of the craft 100. As shown, some examples of control system 500 include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and flight controls 526. In some examples, some or all of these components communicate with one another via one or more communication links 528 (e.g., a system bus, a public, private, or hybrid cloud communication network, etc.)

Some examples of processors 502 correspond to or comprise general-purpose processors (e.g., a single- or multi-core microprocessor), special-purpose processors (e.g., an application-specific integrated circuit or digital-signal processor), programmable logic devices (e.g., a field-programmable gate array), controllers (e.g., microcontrollers), and/or any other processor components now known or later developed. Further, while the one or more processors 502 are illustrated as a separate stand-alone component of the control system 500, it should also be understood that the one or more processors 502 could comprise processing components that are distributed across one or more of the other components of the control system 500.

Some examples of the data storage 504 comprise one or more non-transitory computer-readable storage mediums that are collectively configured to store (i) program instructions executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is Illustrated as a separate stand-alone component of the control system 500, it should also be understood that the data storage 504 may comprise computer-readable storage mediums that are distributed across one or more of the other components of the control system 500.

Some examples of the communication interface 506 include one or more wireless interfaces and/or one or more wireline interfaces, which allow the control system 500 to communicate via one or more networks. Some example wireless interfaces provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols.

Some example wireline interfaces include an Ethernet interface, a Universal Serial Bus (USB) interface, CAN Bus, I-485, or similar interface to communicate via a wire, a twisted pair of wires, a coaxial cable, an optical link, a fiber-optic link, or other physical connection to a wireline network.

Some examples of the propulsion system 508 include one or more electronic speed controllers (ESCs) for controlling one or more electric motors configured to drive one or more of the propeller assemblies 116 distributed across the main wing 104 and, in some examples, across the horizontal stabilizer 124. Some examples of the propulsion system 508 include a separate ESC for each respective electric motor and its corresponding propeller assembly 116, such that the control system 500 individually controls the rotational speeds of each of the electric motors and their corresponding propeller assemblies 116.

Some examples of the actuators 510 include any of the actuators described herein, including (i) actuators for raising and lowering the flaps 118, ailerons 120, elevators 126, main hydrofoil control surfaces 134, and rear hydrofoil control surfaces 140, (ii) actuators for turning the rudder 128, the main hydrofoil control surfaces 134 positioned on the main hydrofoil strut 132, and the rear hydrofoil control surfaces 140 positioned on the rear hydrofoil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Some examples of the actuators correspond to linear actuators, rotary actuators, hydraulic actuators, pneumatic actuators, electric actuators, electro-hydraulic actuators, and mechanical actuators. Some examples of the actuators correspond to electric motors, stepper motors, and hydraulic cylinders. Other examples are contemplated herein as well.

Some examples of the GNSS system 512 are configured to provide a measurement of the location, speed, altitude, and heading of the craft 100. The GNSS system 512 includes one or more radio antennas paired with signal processing equipment. Data from the GNSS system 512 may allow the control system 500 to estimate the position and speed of the craft 100 in a global reference frame, which can be used for route planning, operational envelope protection, and vehicle traffic deconfliction by both understanding where the craft 100 is located and comparing the location with known traffic.

Some examples of the INS 514 include motion sensors, such as angular and/or linear accelerometers, and rotational sensors, such as gyroscopes, to calculate the position, orientation, and speed of the craft 100 using dead reckoning techniques. In some examples, one or more of these components are used by the control system to calculate actuator outputs to stabilize or otherwise control the vehicle during all modes of operation.

Some examples of the radar system 516 include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the craft 100. This radar system 516 may be utilized to detect, for example, the water surface, maritime or wing-borne vehicle traffic, wildlife, or weather.

Some examples of the lidar system 518 comprise a light source and an optical receiver. The light source emits a laser that reflects off an object and returns to the optical receiver. The lidar system 518 measures the time for the reflected light to return to the receiver to determine the distance between the craft 100 and the object. This lidar system 518 may be utilized by the flight control system to measure the distance from the craft 100 to the surface of the water in various spatial measurements.

Some examples of the imaging system 520 include one or more still and/or video cameras configured to capture image data from the environment of the craft 100. Some examples of the cameras correspond to or comprise charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. Some examples of the imaging system 520 are configured to perform obstacle avoidance, localization techniques, water surface tracking for more accurate navigation (e.g., by applying optical flow techniques to images), video feedback, and/or image recognition and processing among other possibilities.

As noted above, some examples of the control system 500 include various other sensors 522 for use in controlling the craft 100. Examples of such sensors 522 correspond to or comprise thermal sensors or other fire detection sensors for detecting a fire in the hull 102 or for detecting thermal runaway in the battery system 400. As further described above, the sensors 522 may include position sensors for sensing the position of the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

Some examples of the sensors 522 facilitate determining the altitude of the craft 100. For instance, some examples of the sensor 522 include an ultrasonic altimeter configured to emit and receive ultrasonic waves. The emitted ultrasonic waves reflect off the water surface below the craft 100 and return to the altimeter. The ultrasonic altimeter measures the time for the reflected ultrasonic wave to return to the altimeter to determine the distance between the craft 100 and the water surface. Some examples of the sensor 522 include a barometer for use as a pressure altimeter. The barometer measures the atmospheric pressure in the environment of the craft 100 and determines the altitude of the craft 100 based on the measured pressure. Some examples of the sensor 522 include a radar altimeter to emit and receive radio waves. The radar altimeter measures the time for the radio wave to reflect off of the surface of the water below the craft 100 to determine a distance between the craft 100 and the water surface. In some examples, these sensors are placed in different locations on the craft 100 to reduce the impact of sensor constraints, such as sensor deadband or sensitivity to splashing water.

Some examples of the control system 500 are configured to use one or more of the sensors 522 or other components of the control system 500 to help navigate the craft 100 through maritime traffic or to avoid any other type of obstacle. For example, some examples of the control system 500 determine the position, orientation, and speed of the craft 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. Some examples of the control system 500 determine the location of an obstacle using the Automatic Identification System (AIS). Some examples of the control system 500 are configured to maneuver the craft 100 to avoid collision with an obstacle based on the determined position, orientation, and speed of the craft 100 and the determined location of the obstacle by actuating various control surfaces of the craft 100 in any of the manners described herein.

Some examples of the flight instrument system 524 include instruments for providing data about the altitude, speed, heading, orientation (e.g., yaw, pitch, and roll), battery levels, or any other information provided by the various other components of the control system 500.

Some examples of the flight controls 526 include one or more joysticks, thrust control levers, buttons, switches, dials, levers, or touch screen displays, etc. In operation, a pilot may use the flight controls 526 to operate one or more control surfaces (e.g., flaps, ailerons, elevators, rudder, propulsion propellers, etc.) of the craft 100 to thereby maneuver the craft 100 (e.g., control the direction, speed, altitude, etc., of the craft 100).

In some examples, the combinations of control surfaces on the craft 100 used by the control system 500 to control operations of the craft 100 depends on the mode of operation of the craft 100 and is determined based at least in part on aspects such as vehicle position, speed, attitude, acceleration, rotational rates, and/or altitude above water. Table 1 summarizes an example of the relationship between the control surfaces and the operation mode.

TABLE 1

| Control Surface | Hull-borne | Foil-borne | Wing-borne |
|---|---|---|---|
| Propulsion | Y | Y | Y |
| Aerodynamic Elevator | N | Y | Y |
| Aerodynamic Ailerons | N | Y | Y |
| Aerodynamic Rudder | Y | Y | Y |
| Aerodynamic Flaps | N | Y | Y |
| Hydrodynamic Elevator | Y | Y | N |
| Hydrodynamic Flaps | Y | Y | N |
| Hydrodynamic Rudder | Y | Y | N |

In some examples, the propulsion control surfaces in the table include the propeller assembly 116, as well as any propellers mounted to the hull 102, main hydrofoil assembly 108, or rear hydrofoil assembly 110. In some examples, the aerodynamic elevator control surfaces include elevator 126, the aerodynamic ailerons include ailerons 120, the aerodynamic rudder includes rudder 128 (when not submerged), the aerodynamic flaps include flaps 118, the hydrodynamic elevator includes rear hydrofoil control surfaces 140, the hydrodynamic flaps include main hydrofoil control surfaces 134, and the hydrodynamic rudder includes rudder 128 (when submerged).

In some examples, when actuating the control surfaces in the various examples, operational modes identified in Table 1 above, the control system 500 executes different levels of stabilization along the various vehicle axes during different modes of operation. Table 2 below identifies examples of stabilization controls that the control system 500 applies during the various modes of operation for each axis of the craft 100. Closed-loop control may comprise feedback and/or feed-forward control.

TABLE 2

| Vehicle Axis | Hull-borne | Foil-borne | Wing-borne |
|---|---|---|---|
| Pitch Axis | None | Closed-loop control on vehicle ride height | Closed-loop control on vehicle altitude |
| Roll Axis | None | Closed-loop control around vehicle bank angle = 0 | Stabilization and closed-loop control on heading |
| Yaw Axis | Rate stabilization | Closed-loop control on vehicle heading | Closed-loop control on vehicle heading |
| Speed Control | Closed-loop control on vehicle GPS Speed | Closed-loop control on vehicle GPS Speed | Closed-loop control on vehicle airspeed |

Further, in some examples, the control system 500 is configured to actuate different control surfaces to control the movement of the craft 100 about its different axes. Table 3 below identifies example axial motions that are affected by the various control surfaces of the craft 100.

TABLE 3

| Control Surface | Axis Control Function |
|---|---|
| Propulsion | (a) accelerate and decelerate the vehicle (b) turn the vehicle about yaw axis (c) create a rolling moment |
| Aerodynamic Elevator | (a) create a pitch up or pitch down moment |
| Aerodynamic Ailerons | (a) create a rolling moment (b) increase lift on aerodynamic wing (c) create a pitch-down moment |
| Aerodynamic Rudder | (a) create a yawing moment |
| Aerodynamic Flaps | (a) increase lift on aerodynamic wing (b) create a pitch-down moment |
| Hydrodynamic Elevator | (a) create a pitch moment (b) generate heave force on rear hydrofoil |
| Hydrodynamic Flaps | (a) generate heave force on main hydrofoil |
| Hydrodynamic Rudder | (a) create a yaw moment |

III. EXAMPLE MODES OF OPERATION

A. Hull-Borne Operation

Figure 6A:
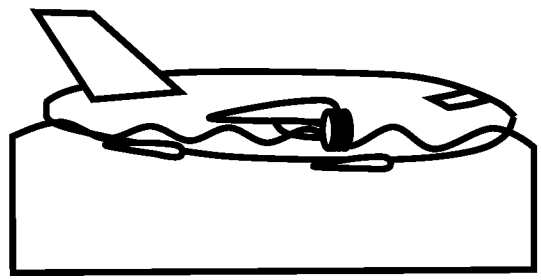
FIG. 6A illustrates a craft in a hull-borne mode of operation, in accordance with example embodiments.

FIG. 6A illustrates an example of the craft 100 when the craft 100 is operating in a hull-borne mode. During this mode, the craft 100 is docked and floating on the hull 102, with the buoyancy of the outriggers 114 providing for roll stabilization of the craft 100. While docked, the battery system 400 of the craft 100 may be charged. In some examples, rapid charging is aided by an open or closed-loop water-based cooling system. In some examples, the surrounding body of water is used in the loop or as a heat sink. In some examples, the craft 100 includes a heat sink integrated into the hull 102 for exchanging heat from the battery system 400 to the surrounding body of water. In other examples, the heat sink is located offboard in order to reduce the mass of the craft 100.

Additionally, in some examples, the propeller assemblies 116 are folded in a direction away from the dock while the craft 100 is docked to help avoid collision with nearby structures or people. This folding may be actuated in various ways, such as by metal spring force, hydraulic pressure, electromechanical actuation, or centrifugal force due to propeller rotation. Other examples are possible as well. Further, in some examples, the main hydrofoil assembly 108 and the rear hydrofoil assembly 110 are retracted (or partially retracted) to avoid collisions with nearby underwater structures.

In some examples, when the craft 100 is ready to depart, the craft 100 uses its propulsion systems, including the propeller assemblies 116 and/or the underwater propulsion system (e.g., one or more outrigger propulsion systems, one or more propeller pods mounted to the hull 102, the main hydrofoil 130, and/or the rear hydrofoil 136), to maneuver away from the dock while remaining hull-borne. In some examples, the main hydrofoil assembly 108 and the rear hydrofoil assembly 110 remain retracted (or partially retracted) during this maneuvering to reduce the risk of hitting underwater obstacles near docks or in shallow waterways. However, when there is a limited risk of hitting underwater obstacles, the craft 100 may partially or fully extend the main hydrofoil assembly 108 and/or the rear hydrofoil assembly 110. With the main hydrofoil assembly 108 and/or the rear hydrofoil assembly 110 extended, the craft 100 actuates the main hydrofoil control surfaces 134 and/or the rear hydrofoil control surfaces 140 to improve maneuverability as described above.

In some examples, at low speeds during hull-borne operation, the control system 500 controls the position and/or rotation of the craft 100 by causing all of the propeller assemblies 116 to spin at the same idle speed, but with a first subset spinning in a forward direction and a second subset spinning in a reverse direction. For instance, in some examples, the control system 500 causes propeller assemblies 116*a*, 116*c*, 116*e*, 116*h*, 116*j*, and 116*l* to idle in reverse and propeller assemblies 116*b*, 116*d*, 116*f*, 116*g*, 116*i*, and 116*k* to idle forward. In this arrangement, the control system 500 causes the craft 100 to make various maneuvers without having to change the direction of rotation of any of the propeller assemblies 116. For instance, to induce a yaw on the craft 100, in some examples, the control system 500 increases the speed of the reverse propeller assemblies on one side of the main wing 104 while increasing the speed of the forward propeller assemblies on the other side of the main wing 104 and without causing any of the propeller assemblies to transition from forward to reverse or from reverse to forward. For example, idling the propellers at a nominal RPM may allow for a faster response in generating a yaw moment on the craft 100 because the propellers required for generating the yaw moment do not have to increase from zero RPM to the desired RPM value. They can spin from the idle RPM to the desired RPM value.

B. Foil-Borne Maneuvering Operation

Figure 6B:
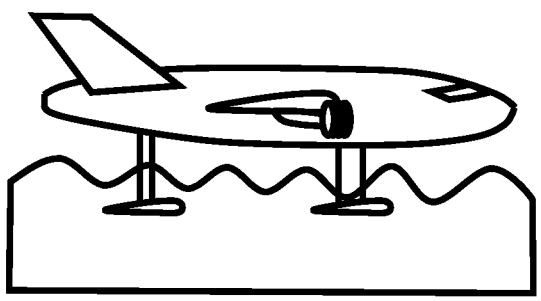
FIG. 6B illustrates a craft in a hydrofoil-borne maneuvering mode of operation, in accordance with example embodiments.

FIG. 6B illustrates an example of the craft 100 when the craft 100 is operating in hydrofoil-borne maneuvering mode. During this mode, the craft 100 is configured to, for example, move through harbors and crowded waterways at speeds generally between 20-45 mph. In this regard, the craft 100 may extend the main hydrofoil assembly 108 and the rear hydrofoil assembly 110 (if not already extended) and accelerate using the previously described propulsion system towards a desired takeoff speed. During acceleration, the craft 100 reaches a speed at which the main hydrofoil assembly 108 and the rear hydrofoil assembly 110 alone support the weight of the craft 100, and the hull 102 is lifted above the surface of the water (e.g., by 3-5 ft) so that the hull is clear of any surface waves. After the hull 102 leaves the surface of the water, the drag forces exerted on the craft 100 drop significantly, and the amount of thrust required to maintain acceleration can be reduced. Therefore, in some examples, after the hull 102 has left the water, the control system 500 reduces the speed of the propeller assemblies 116 to lower the thrust of the craft 100.

Some examples of the control system 500 sustain this operational mode by actively controlling the pitch and speed of the craft 100 so that the main hydrofoil assembly 108 and the rear hydrofoil assembly 110 continue to entirely support the weight of the craft 100. In this regard, some examples of the control system 500 actuate the main hydrofoil control surfaces 134 and/or the rear hydrofoil control surfaces 140 and/or the propulsion system to stabilize the attitude of the craft 100 to maintain the desired height above the surface of the water, vehicle heading, and vehicle forward speed. In this regard, some examples of the control system 500 are configured to detect various changes in the yaw, pitch, or roll of the craft 100 based on data provided by the INS 514 and to make calculated actuations of the main hydrofoil control surfaces 134 and/or the rear hydrofoil control surfaces 140 to counteract the detected changes.

C. Foil-Borne Takeoff Operation

Figure 7A:
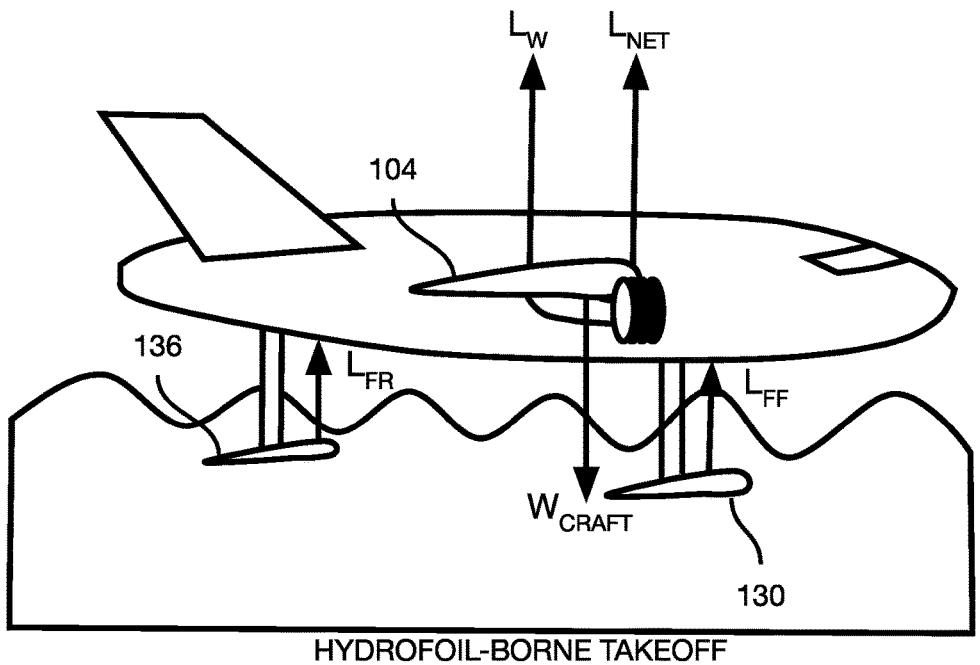
FIG. 7A illustrates a craft in a hydrofoil-borne takeoff mode of operation, in accordance with example embodiments.

FIG. 7A illustrates an example of the craft 100 when the craft 100 is operating in hydrofoil-borne takeoff mode. During this mode, the craft 100 is configured to, for example, move through open waters and obtain speeds generally between 40-50 mph to facilitate generating the lift required to become wing-borne.

Referring to FIG. 7A, aero lift, LW, generally represents the lift generated by the main wing 104 of the craft 100 but can also include the lift generated by other surfaces such as the tail wing, hull, or propulsive devices such as propellers, rotors, jets, etc. LF generally corresponds to the lift generated by one or more hydrofoils 130, 136 of the craft 100, where LFF corresponds to the lift generated by the front foil and the LFR corresponds to the lift generated by the rear foil. WCRAFT corresponds to the force of gravity exerted on the craft 100 and is also referred to as the weight of the craft. During steady state operation, WCRAFT generally corresponds to LW+LFR+LFF which also corresponds to LNET. Throughout the description, the term LF is generally understood to correspond to LFR+LFF.

As previously noted, some experimental craft developed by Applicant that include aero foils were unable to achieve the lift required to sustain flight. In these experimental craft, in an attempt to become airborne, the craft 100 would ramp up to a speed at which point the hydrofoil would breach the surface of the water, as WCRAFT<Lw+LF, and LF>0, resulting in Lw<WCRAFT. However, in order to takeoff from the water's surface, the aero lift must be greater than or equal to the weight of the craft, however prior to takeoff, the hydrofoils are still under the water's surface, and up until takeoff, have been generating lift (LF>0) as the aerodynamic lift has been insufficient for takeoff up until this point. If the hydro lift and the aero lift sum to greater than the weight of the craft, the vehicle will accelerate upwards and potentially create a premature takeoff condition (prior to condition C0 in FIG. 7B) as the aero lift, LW, generated by the wings, etc., of the craft 100 would be insufficient to sustain flight, and, as a result, the craft 100 would come back down and breach the water, ultimately preventing takeoff. The techniques disclosed below ameliorate these problems by controlling the hydrofoil lift vector, LF, specifically by generating downward forces of one or more hydrofoils 130, 136 of the craft 100 to keep the hydrofoils 130, 136 submerged until after the upwards aero lift, LW, is sufficient to allow the craft 100 to sustain flight.

In some examples, the lift LF is in the downward direction, and is introduced via the hydrofoil(s) as LW increases beyond WCRAFT while the craft 100 is increasing in speed in anticipation of takeoff. This allows the craft 100 to generate a greater overall aero lift, LW, prior to actual takeoff than would otherwise be possible. Then, at the appropriate time (e.g., when LW reaches some predetermined threshold such as the weight of the craft 100 or some margin thereof), the negative lift, LF, can be "released" from the craft 100, and the craft 100 can, as a result, proceed to become wing-borne.

Figure 7B:
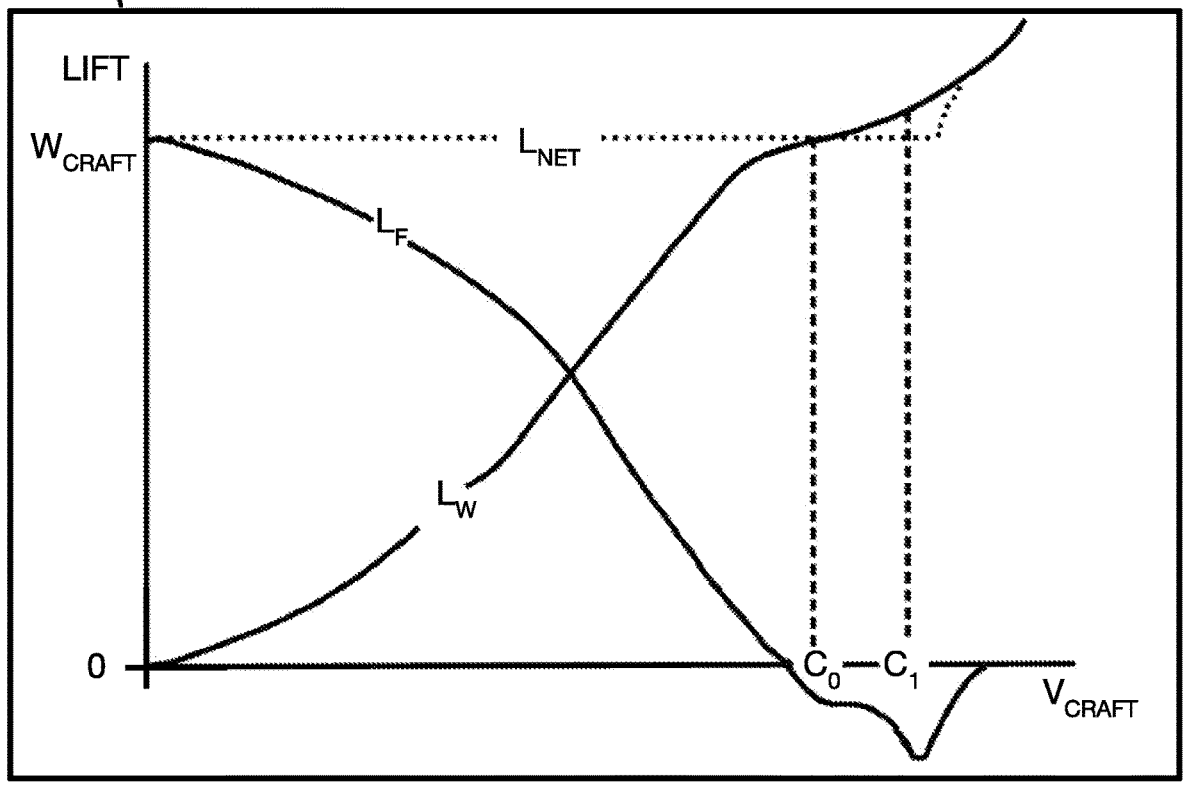
FIG. 7B is a graph that illustrates various lift forces acting on a craft, in accordance with example embodiments.

FIG. 7B is an example of a graph 700 that relates these aspects. The relationships shown in the graph 700 and the ways in which various lift forces, thresholds, etc., are depicted are merely examples and are provided to aid understanding of the various operations and procedures described herein. As shown, the net lift, LNET, on the craft 100 initially corresponds to the combination of the aero lift, LW, generated by the wing (e.g., main wing, tail wing, etc.) and the lift, LF, generated by the hydrofoils 130, 136 (e.g., LNET=LW+LF). On the left side of the graph 700, the speed of the craft 100 is such that LNET is sufficient to allow the craft 100 to operate in hydrofoil-borne maneuvering mode but is insufficient to allow the craft 100 to become wing-borne. Moving to the right of the graph 700 as speed increases, LW increases with increased craft 100 water speed. To maintain ride height and prevent the hydrofoils 130, 136 from breaching the water surface, LF is reduced in proportion to an increase in LW. For example, LF is adjusted with the speed of the craft 100 to maintain LNET at a margin equal to the weight, WCRAFT, of the craft 100, or small deviations about equal to control ride height. The overall lift provided by the hydrofoils 130, 136 may decrease at the same rate at which lift from the wing is increased towards zero or even become negative with increased speed. For example, just before the speed of the craft 100 reaches the speed associated with condition C0, LF may be reduced to zero. The conditions at C0 (e.g., speed of the craft 100, angle of attack of craft 100, deflection angles of control surfaces, angle of incidence of hydrofoils, etc.) may be such that LF may be zero or close to zero. At C0, the aero lift, LW, generated by the main wing 105 may be expected to be able to transition the craft 100 to a wing-borne mode of operation if the downwards hydrofoil lift, LF, were to be removed as LW=WCRAFT. Accordingly, at some time and/or increased speed after this point (e.g., speed associated with condition C1) where LW>WCRAFT, LF may be gradually or abruptly removed/released. This, in turn, allows LNET to approximately equal to or greater than WCRAFT which allows the craft 100 to take off and become wing-borne.

While not shown in the graph, in some examples, LF is not removed/released as described. Rather, as the craft 100 continues to accelerate, the downwards hydrofoil lift, LF, increases to a maximum downwards amount (e.g., a predetermined maximum amount and/or a maximum amount achievable due to the limitations of the control capabilities of the hydrofoil). As the aero lift, LW, generated by the main wing 105 continues to increase past this maximum amount of downwards hydrofoil lift, $L_F$, $L_{NET}$ increases in the upwards direction beyond WCRAFT and the craft 100 is pulled from the water. This, in turn transitions the craft 100 to a wing-borne mode of operation.

D. Wing-Borne Operation

Figure 8:
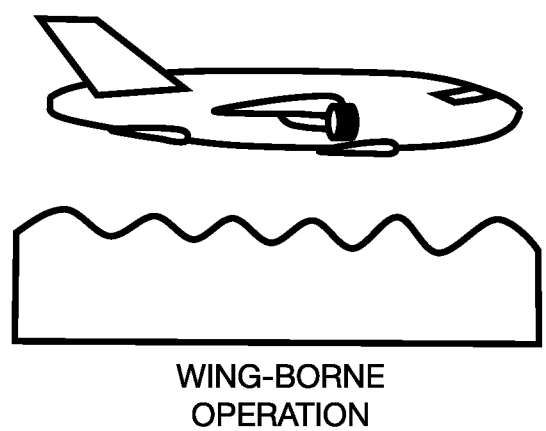
FIG. 8 illustrates a craft in a wing-borne mode of operation, in accordance with example embodiments.

FIG. 8 illustrates an example of the craft 100 after becoming wing borne. In some examples, once the transition from hydrofoil-borne operation to wing-borne operation is complete, the control system 500 causes the main hydrofoil deployment system 200 and the rear hydrofoil deployment system 300 to respectively retract the main hydrofoil assembly 108 and the rear hydrofoil assembly 110. In some examples, the control system 500 initiates this retraction as soon as the hydrofoil assemblies 108, 110 are clear of the water to reduce the chance of the hydrofoil assemblies 108, 110 reentering the water. The control system 500 may determine that the hydrofoil assemblies 108, 110 are clear of the water in various ways. For instance, in an example, the control system 500 makes such a determination based on a measured altitude of the craft 100 (e.g., based on data provided by the radar system 516, the lidar system 518, and/or the other sensors 522 described above for measuring an altitude of the craft 100). In another example, the sensors 522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water-based on data from these sensors.

Once the craft 100 is clear of the water, the control system 500 continues to accelerate the craft 100 to the desired cruise speed by controlling the speed of the propeller systems 116. In some examples, the control system 500 retracts the flap systems when the craft 100 has achieved sufficient airspeed to generate enough lift to sustain altitude without them and actuates various control surfaces of the craft 100 and/or applies differential thrust to the propeller systems 116 to perform any desired maneuvers, such as turning, climbing, or descending, and to provide efficient lift distribution. While in wing-borne mode, the craft 100 can fly both low over the water's surface in ground-effect or above ground-effect depending on operational conditions and considerations.

E. Return to Hull-Borne Operation

To facilitate transitioning from wing-borne to hull-borne mode of operation (See FIG. 6A), the control system 500 determines that the hydrofoil assemblies 108, 110 are fully or partially retracted so that the craft 100 may safely land on its hull 102. In some examples, the control system 500 additionally determines and suggests the desired landing direction and/or location-based on observed, estimated, or expected water surface conditions (e.g., based on data from the radar system 516, the lidar system 518, the imaging system 520, or other sensors 522).

The control system 500 initiates deceleration of the craft 100, for instance, by reducing the speeds of the propeller systems 116 until the craft 100 reaches a desired landing airspeed. During the deceleration, the control system 500 may deploy the flaps 118 to increase lift at low airspeeds and/or to reduce the stall speed. Once the craft 100 reaches the desired landing airspeed (e.g., approximately 50 knots), the control system 500 reduces the descent rate (e.g., to be less than approximately 200 ft/min). As the craft 100 approaches the surface of the water (e.g., once the control system 500 determines that the craft 100 is within 5 feet of the water surface), the control system 500 further slows the descent rate to cushion the landing (e.g., to be less than approximately 50 ft/min). As the hull 102 of the craft 100 impacts the surface of the water, the control system 500 reduces thrust, and the craft 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the craft 100 is stationary.

In some examples, after the craft 100 is settled in the water, the craft 100 is transitioned back to hydrofoil-borne maneuvering mode (See FIG. 6B) by extending the hydrofoil assemblies 108, 110 to transition from hull-borne operation to hydrofoil-borne operation in the same manner as described above. In some examples, the control system 500 then sustains the hydrofoil-borne mode at the fifth stage and maneuvers the craft 100 into port while keeping the hull 102 insulated from surface waves. The control system 500 then reduces the thrust generated by the propeller assemblies 116 to lower the speed of the craft 100 until the hull 102 settles into the water, thereby transitioning that craft back to hull-borne operation at the sixth stage. The control system 500 then retracts the hydrofoil assemblies 108, 110 and performs the hull-borne operations described above to maneuver the craft 100 into a dock for disembarking passengers or goods and recharging the battery system 400.

IV. HYBRID PROPULSION SYSTEM EXAMPLES

As noted above, some examples of craft 100 described herein have propellers distributed across the main wing 104, and in some examples, all of the propellers are driven via battery-powered electric motors. In some other examples, a subset of these propellers are driven instead via an internal combustion motor. That is, a first subset of the propellers are driven by electric motors, and a different subset of the propellers are driven by internal combustion motors. In some examples, each of the internal combustion motors is a turboprop motor. However, as mentioned previously, the internal combustion motors can be any type of internal combustion motor now known or later developed that is suitable for driving the propellers and/or charging battery systems. Examples where some of the propeller assemblies are driven by internal combustion motors and some of the propeller assemblies are driven by electric motors are sometimes referred to herein as having hybrid propulsion systems.

Some examples with hybrid propulsion systems additionally or alternatively include hybrid motors. As mentioned previously, a hybrid motor includes at least one internal combustion motor configured to charge one or more battery systems (e.g., battery system 400 shown and described with reference to FIG. 4), where the one or more battery systems are arranged to power at least one electric motor that is configured to drive a corresponding propeller assembly. In some examples that include a hybrid motor, the internal combustion motor may be configured to drive one or more propeller assemblies and charge one or more battery systems. In some instances, the internal combustion motor (of the hybrid motor) may switch between driving the one or more propeller assemblies and charging the one or more battery systems. In some instances, the internal combustion motor (of the hybrid motor) may charge the one or more battery systems while driving the one or more propeller assemblies. In some embodiments, a hybrid motor may be configured to switch between powering a propeller assembly via an electric motor and powering the propeller assembly via the internal combustion motor, i.e., some hybrid motors are configured to power the same propeller assembly via either the electric motor component or the internal combustion motor component of the hybrid motor.

In general, for both internal combustion motors configured to drive propeller assemblies and internal combustion motors (of a hybrid motor) configured to one or both (a) charge one or more battery systems arranged to power one or more electric motors configured to drive propeller assemblies and/or (b) drive propeller assemblies, the fuel used to power the internal combustion motors tends to have a greater energy-to-weight/volume ratio than the batteries (of the battery system(s)) used to power the electric motors. In other words, the craft 100 can potentially travel further on, say, 1 liter (10 cm$^3$) of fuel than it can on a 10 cm$^3$ battery. This aspect facilitates increasing the range of the craft 100. For example, some of the compartment space that would otherwise be used for storing batteries could be used instead to store fuel for the internal combustion motors. Alternatively, this compartment space could be reduced to an extent freeing up space for other purposes, such as storing cargo. As such, in some examples, the proportion of batteries to fuel in the compartment space of the craft 100 is selected based on the particular applications/missions the craft 100 is intended to perform.

For instance, in examples where the craft 100 is intended to make short trips and thus have more charging opportunities, the relative volume/proportion of batteries to fuel in the compartment space can be increased (e.g., to accommodate additional batteries). In examples where the craft 100 may require more range, the relative volume/proportion of batteries to fuel in the compartment space can be decreased (e.g., to accommodate more fuel).

In some examples of the craft 100, the electric motors are used to drive at least some of the propeller assemblies during takeoff, acceleration, and landing procedures and the internal combustion motors are used to drive at least some of the propeller assemblies when the craft 100 is cruising at altitude. As described in later sections, in some examples, the craft 100 is configured to operate one or more of the propeller assemblies driven by electric motors when the craft 100 is cruising at altitude to provide supplemental (boost) thrust if needed. Additionally or alternatively, the propeller assemblies driven by the electric motors can be fully engaged should a problem occur with one or more of propeller assemblies driven by the internal combustion motors.

In some examples, the craft 100 is configured to operate the propeller assemblies driven by the internal combustion motors while the craft 100 is cruising at altitude toward a target region. When the craft 100 is near the target region, the craft 100 may (i) disengage the propeller assemblies driven by the internal combustion motors and (ii) engage the propeller assemblies driven by the electric motors to support stealth flying operations of the craft 100 near the target region, since the electric motors tend to be quieter than the internal combustion motors.

In some examples, the craft 100 is configured to engage the propeller assemblies driven by the internal combustion motors and the propeller assemblies driven by the electric motors during takeoff, acceleration, and landing procedures. For example, in scenarios where the craft 100 is configured to use the electric motor driven propeller assemblies during takeoff, acceleration, and landing, the craft 100 may be configured to additionally engage the internal combustion motor driven propeller assemblies to provide supplemental (boost) thrust to the craft 100, which may be beneficial in situations where, for example, one or more of the electric motors were to fail or become compromised in some way. In some configurations with hybrid motors, the craft is configured to switch between powering one or more propeller assemblies via an electric motor component and powering the one or more propeller assemblies via an internal combustion motor component based on the stage of flight of the craft. For example, in some instances, the craft 100 is configured to power the one or more propeller assemblies via the internal combustion motor component during takeoff and acceleration, switch to powering the one or more propeller assemblies via the electric motor component during flight, and then switch back to powering the one or more propeller assemblies via the internal combustion motor component for landing.

In some examples, the internal combustion motor driven propellers are engaged during other and/or additional stages of operations. For instance, the internal combustion motor driven propellers may be engaged while the craft 100 is hull-borne, hydrofoil-borne, taking off and/or landing. In some examples, a relatively static amount of thrust may be generated by the propeller assemblies driven by the internal combustion motors during these stages of operation. In some other examples, the craft 100 may employ different combinations of electric motor driven propeller assemblies and internal combustion motor driven propeller assemblies to generate different amounts of thrust depending on the desired amount of thrust that may be required during these stages of operation, e.g., generating differing amounts of thrust via differing combinations of propeller assemblies during hull-borne, hydrofoil-borne, taking off and/or landing stages of operation.

In some other examples, the craft 100 may be configured to generate different amounts of thrust by activating different combinations of propeller assemblies. For instance, less thrust may be needed (or desired) from the propeller assemblies driven by the internal combustion motors during stages of operation in which the craft 100 is generating more thrust from the propeller assemblies driven by the electric motors, and vice versa.

Disclosed embodiments that employ aspects of the disclosed hybrid propulsion systems that include a combination of one or more electric motors, internal combustion motors, and/or hybrid motors (that include at least one internal combustion motor and at least one electric motor) provide for great flexibility in operational modes.

For example, in some embodiments, the craft may be configured to operate in any of: (i) an "electric propulsion" mode, (ii) an "internal combustion propulsion" mode, (iii) a "hybrid propulsion" mode, (iv) an "electric propulsion with internal combustion charging" mode, (v) an "internal combustion propulsion with internal combustion charging" mode, (vi) a "hybrid propulsion with internal combustion charging" mode; and/or (vii) an "internal combustion charging" mode. In some embodiments, the craft may be configured to switch between operating in any one or more of the above-listed operating modes.

In some examples while the craft is operating in the "electric propulsion" mode, the electric motors (either standalone electric motors or electric motor components of a hybrid motor configuration) are configured to drive the propeller assemblies that are providing thrust for the craft, and the internal combustion motors (either standalone electric motors or electric motor components of a hybrid motor configuration) are not actively operating. This "electric propulsion" mode may be advantageous in several scenarios, including but not limited to, takeoff, during flight, and/or landing. Because the internal combustion motors are not actively operating during the "electric propulsion" mode, the power to drive the propeller assemblies is provided only by the one or more battery systems. Therefore, the "electric propulsion" mode may be advantageous in scenarios where quieter operation is desired or required.

In some examples while the craft is operating in the "internal combustion propulsion" mode, the internal combustion motors (either standalone internal combustion motors or internal combustion components of a hybrid motor configuration) are configured to drive the propeller assemblies that are providing thrust for the craft, and the electric motors (either standalone electric motors or electric motor components of a hybrid motor configuration) are not actively operating. This "internal combustion propulsion" mode may be advantageous in several scenarios, including but not limited to, takeoff, during flight, and/or landing. In some scenarios, operating in the "internal combustion propulsion" mode may be advantageous for longer duration flights where the one or more battery systems may be unable (i.e., lack sufficient charge capacity) to power the electric motors for the entirety of the flight.

In some examples while the craft is operating in the "hybrid propulsion" mode, the thrust for the craft is provided by both (a) one or more electric motors (either standalone electric motors or electric motor components of a hybrid motor configuration) and (b) one or more internal combustion motors (either standalone internal combustion motors or internal combustion components of a hybrid motor configuration). This "hybrid propulsion" mode may be advantageous in several scenarios, including but not limited to, takeoff, during flight, and/or landing. In some scenarios, operating in the "hybrid propulsion" mode may be advantageous where additional thrust is desired or required, such as during a fast takeoff, during a rapid climb, or other scenarios where the craft may need more thrust than is available when operating in the "electric propulsion" or "internal combustion propulsion" modes. Operating in the "hybrid propulsion" mode may also be advantageous in scenarios where generating thrust for the craft via the propeller assemblies driven by both the electric motors and the internal combustion motors may be more energy efficient than generating the thrust for the craft via the propeller assemblies driven by just the electric motors (e.g., in "electric propulsion" mode) or the internal combustion motors (e.g., in "internal combustion propulsion" mode). In some examples, operating in the "hybrid propulsion" mode may help provide enhanced control over the craft during turbulence or other challenging flight situations where additional thrust may be desired or required.

In some examples where the craft is operating in the "electric propulsion with internal combustion charging" mode, the electric motors (either standalone electric motors or electric motor components of a hybrid motor configuration) are configured to drive the propeller assemblies that are providing thrust for the craft while the internal combustion motors (either standalone electric motors or electric motor components of a hybrid motor configuration) are configured to charge one or more battery systems arranged to provide power to the electric motors. In some scenarios, operating in the "electric propulsion with internal combustion charging" mode may be advantageous where it is desirable to primarily rely on the electric motors to drive the propeller assemblies providing thrust for the craft since the internal combustion engines can charge the battery systems that are providing power to the electric motors that are driving the propeller assemblies. In some instances, operating in the "electric propulsion with internal combustion charging" mode may tend to generate less pollutants during flight as compared to the "hybrid propulsion" and/or "internal combustion propulsion" modes.

In some examples where the craft is operating in the "hybrid propulsion with internal combustion charging" mode, (i) the thrust for the craft is provided by one or more electric motors (either standalone electric motors or electric motor components of a hybrid motor configuration) and one or more internal combustion motors (either standalone internal combustion motors or internal combustion components of a hybrid motor configuration) and (ii) one or more internal combustion motors (either standalone internal combustion motors or internal combustion components of a hybrid motor configuration) are configured to charge the one or more battery systems arranged to provide power to the one or more electric motors (either standalone electric motors or electric motor components of a hybrid motor configuration). In some scenarios, operating in the "hybrid propulsion with internal combustion charging" mode may be advantageous where it is desirable (or perhaps necessary) to rely on both the electric motors and the internal combustion motors to drive the propeller assemblies that are providing thrust for the craft, while it is also desirable for the internal combustion engines to charge the battery systems that are providing power to the electric motors that are driving the propeller assemblies.

Operating in the "hybrid propulsion with internal combustion charging" mode may, at least in some instances, tend to generate more pollutants during flight as compared to the "hybrid propulsion," "internal combustion propulsion," and "electric propulsion with internal combustion charging modes since the internal combustion motors are driving propeller assemblies and charging the battery systems. However, operating in the "hybrid propulsion with internal combustion charging" mode at least during some phases of a trip may help extend the range of flight via the electric motors, which may in turn result in more efficient operation of the craft over the duration of the flight. Operating in the "hybrid propulsion with internal combustion charging" mode may additionally help provide enhanced control over the craft during turbulence or other challenging flight situations where additional thrust may be desired or required. One scenario where "hybrid propulsion with internal combustion charging" may be advantageous is during takeoff where thrust is primarily provided by the electric motors with supplemental thrust provided by the internal combustion motors while the internal combustion motors additionally charge the battery system(s) powering the electric motors.

In some examples where the craft is operating in the "internal combustion charging" mode, the internal combustion motors (either standalone internal combustion motors or internal combustion components of a hybrid motor configuration) are configured to charge one or more battery systems and the electric motors (either standalone electric motors or electric motor components of a hybrid motor configuration) are not actively operating. Operating in the "internal combustion charging" mode may be advantageous in scenarios where the craft is docked at a location where external power for recharging the one or more battery systems is not available. Operating in the "internal combustion charging" mode may be particularly advantageous in circumstances where external power for recharging the battery systems is not available but liquid fuel for refueling the internal combustion motors is available.

H. Engine Placement Examples

Figure 9B:
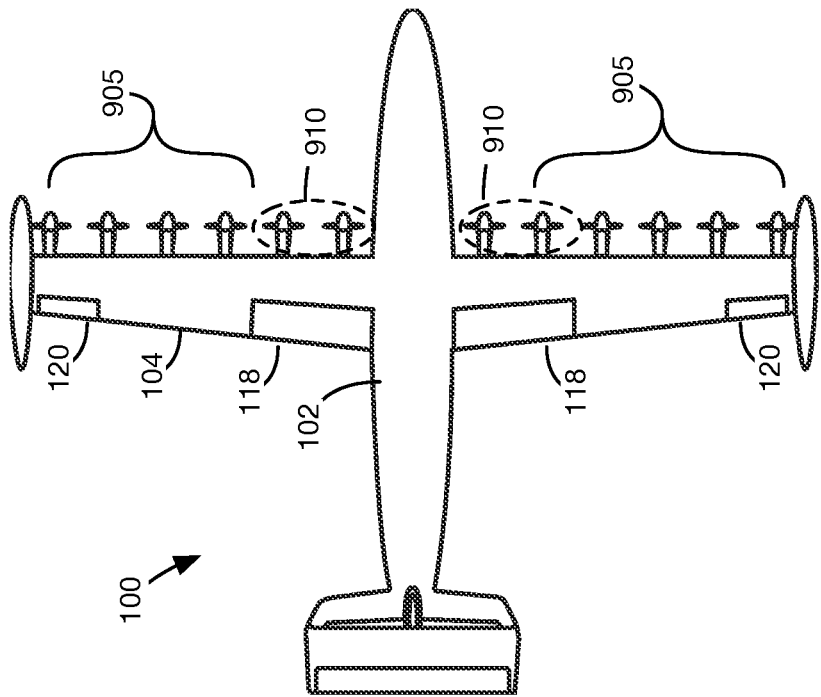
FIG. 9B illustrates a craft where the two innermost propellers on either side of the hull are combustion motor propellers, and the other propellers are electric motor propellers, in accordance with example embodiments.
Figure 9A:
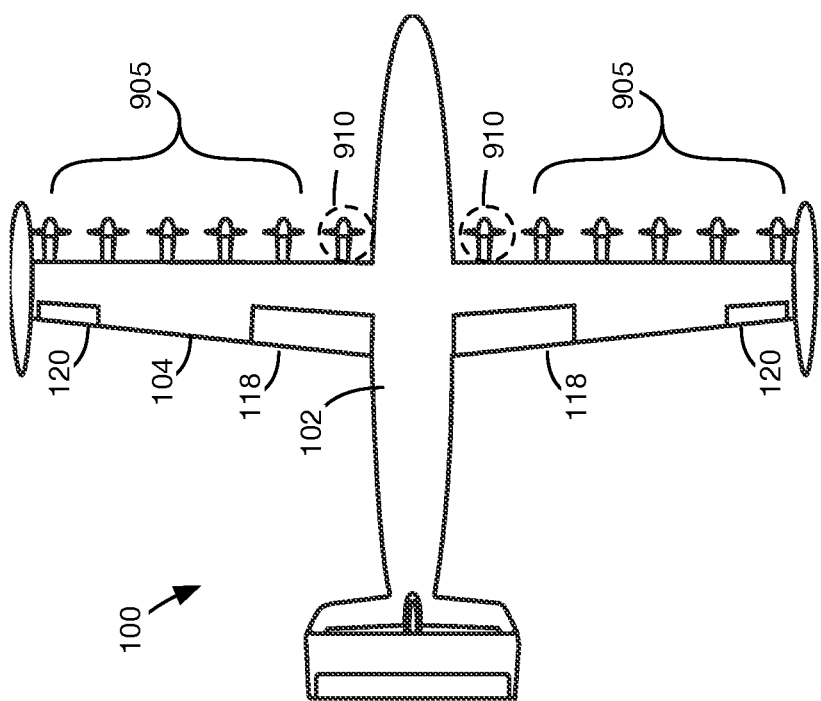
FIG. 9A illustrates a craft where the propellers closest to the hull are combustion motor propellers, and the other propellers are electric motor propellers, in accordance with example embodiments.

FIGS. 9A-9D illustrate various arrangements of electric motor driven propeller assemblies 905 and internal combustion motor driven propeller assemblies 910 on examples of the craft 100. As noted above, in some examples, a combination of electric motor driven propellers 905 and combustion motor driven propellers 910 are distributed across the main wing 104. For instance, as shown in FIG. 9A, in some examples, the innermost propellers 910 (e.g., those closest to the hull 102) are driven by internal combustion motors, and the other propellers 905 are driven by electric motors. One reason for placing the internal combustion motor driven propellers 910 closer to the hull 102 is that if one of the internal combustion motor driven propellers 910 were to fail, there would be less impact on the yaw of the craft 100. Failure of a motor further from the hull 102 may induce greater yaw or roll on the craft 100, possibly making the craft 100 more difficult to maneuver. Another reason, placing the propellers 910 driven by combustion motors closer to the hull 102 facilitates using shorter fuel lines (e.g., if the fuel is carried in the hull 102 of the craft 100). The shorter fuel lines may improve fuel efficiency to an extent and reduce opportunities for fuel leaks. Another reason for placing the propellers 910 driven by the internal combustion motors closer to the hull 102 is that the internal combustion motor driven propellers 910 may, in some examples, be used primarily to provide thrust (e.g., as opposed to control authority), and the sections of the main wing 104 nearest the hull 102 may correspond to those sections of the main wing that do not provide any meaningful control authority over the craft 100.

As shown in FIG. 9B, in another example, the two innermost propellers 910 may be driven by internal combustion motors, and the other propellers 905 are driven by electric motors. For example, two internal combustion motor driven propellers 910 having the combined output power approximating the single internal combustion motor driven propellers 910 of FIG. 9A may be used. Dividing the power among two internal combustion motor driven propellers 910 provides an additional degree of redundancy (e.g., should one of the internal combustion motors driving the propellers 910 fail).

Figure 9D:
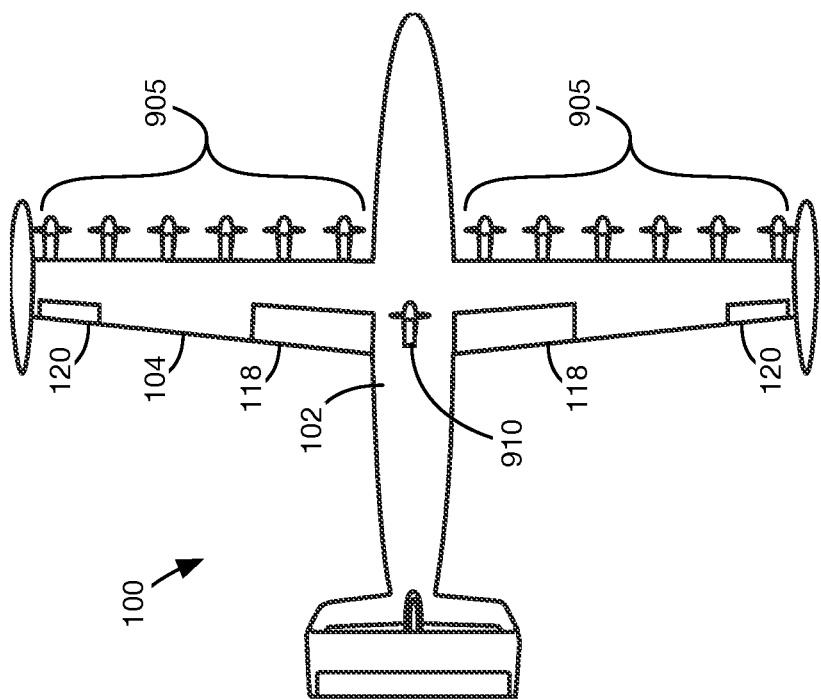
FIG. 9D illustrates a craft with a single combustion motor propeller provided on the top of the fuselage/hull, near the center of gravity of the craft, in accordance with example embodiments.
Figure 9C:
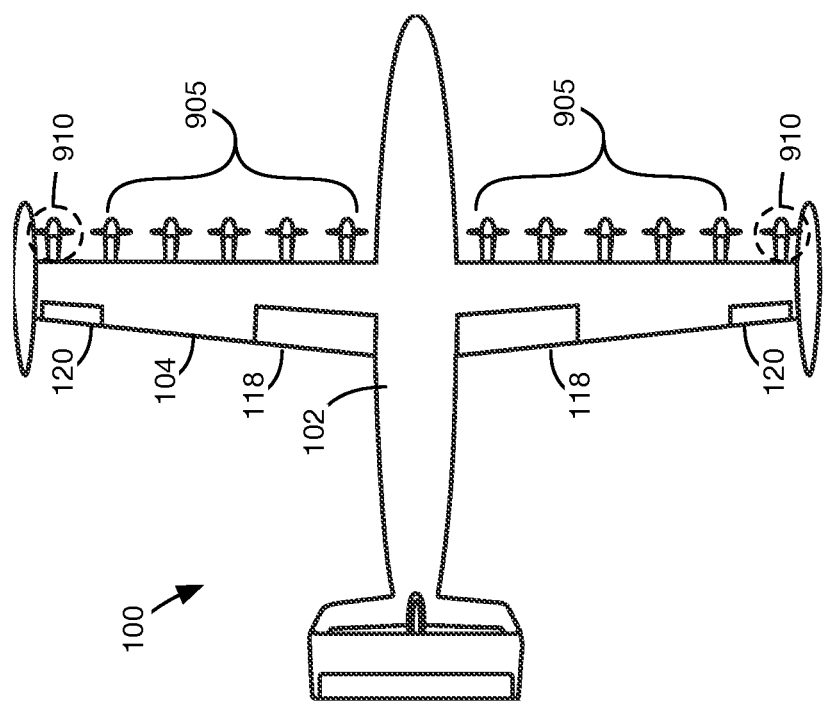
FIG. 9C illustrates a craft where the combustion motor propellers are placed near regions of a main wing of a craft such that the combustion motor propellers contribute meaningfully to the overall lift acting on the craft or the overall control authority of the craft, in accordance with example embodiments.

As shown in FIG. 9C, in some examples, the propellers 910 driven by the internal combustion motors may be placed near regions of the main wing 104 such that the internal combustion motor driven propellers 910 contribute meaningfully to the overall lift acting on the craft 100 or the overall control authority of the craft 100. For instance, as previously noted, in some examples, the propellers are distributed across the leading edge of the main wing 104 to provide a blown-wing propulsion system. As such, in some examples, the internal combustion motor driven propellers 910 may be located such that their wake blows over the ailerons 120 or flaperons 118 along the main wing 104. This configuration may be particularly useful where the propellers 910 driven by the internal combustion motors are intended to be operated in various manners of control of the aircraft while the craft is cruising at altitude. Placing of propulsion systems near such control surfaces is discussed in U.S. Provisional App. 63/490,342, filed Mar. 15, 2023, entitled "Airspeed Control in Blown Wing Aircraft," which is incorporated herein by reference in its entirety.

Figure 9E:
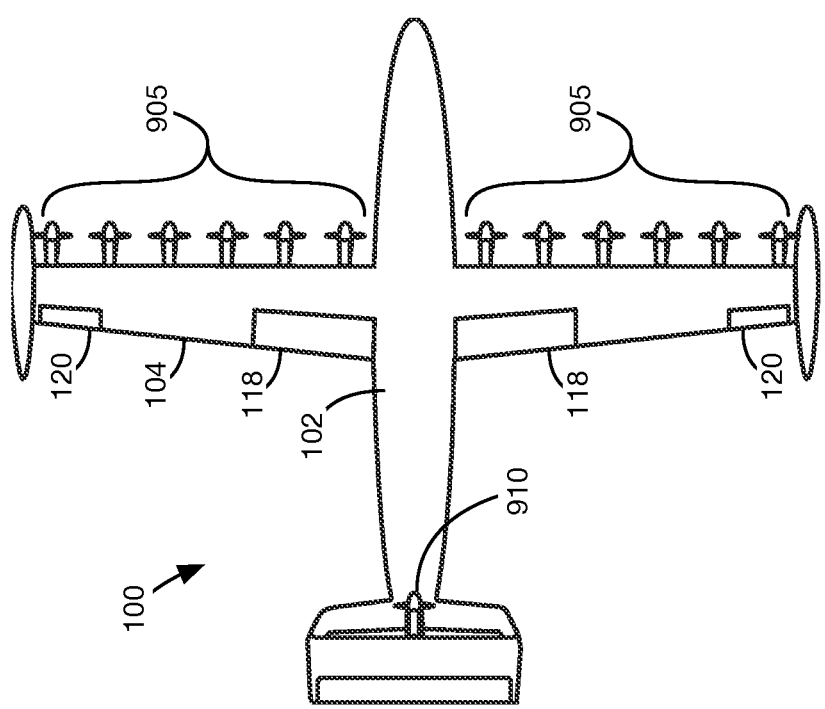
FIG. 9E illustrates a craft with a single combustion motor propeller provided in the rear center of the craft, in accordance with example embodiments.

As shown in FIGS. 9D and 9E, rather than (or in addition to) placing internal combustion motor driven propellers 910 on the main wing 104, in some examples, a single internal combustion motor driven propeller 910 may be provided on a different section of the craft 100. For example, as shown in FIG. 9D, a single internal combustion motor driven propeller 910 may be provided on the top of the fuselage/hull and perhaps closer to the center of gravity. As shown in FIG. 9E, a single internal combustion motor driven propeller 910 may be provided in the rear center of the craft 100 (e.g., near or integrated within vertical stabilizer 122 (see FIG. 1A) of the tail rudder). The internal combustion motor driving propeller 910 used in these examples may be larger and more powerful than internal combustion motors that may be otherwise placed on the main wing 104. For example, the internal combustion motor driven propeller 910 used on these sections of the craft 100 may be capable of generating a thrust equal to (or nearly equal to) the combined thrust of two of the internal combustion motor driven propellers 910 that may otherwise be placed on the main wing 104.

I. Motor Configurations Examples

In some examples, the configuration (e.g., the pitch, diameter, quantity of blades, solidity, etc.) of one or more of the electric motor driven propellers 905 and the internal combustion motor driven propellers 910 may be selected based on factors such as the type of motor (e.g., electric vs. internal combustion), when the motor is intended to be used (e.g., while cruising, landing, etc.), and where the motor is intended to be used (e.g., near hull 102, near ailerons 120, etc.). For instance, if the internal combustion motor driven propellers 910 are to be used primarily when the craft 100 is cruising at altitude, larger sized (e.g., length/width) propellers may be used to facilitate more efficient cruising at altitude.

In some examples, one or more of the electric motor driven propellers 905 may be used primarily when the craft 100 is taking off, ascending, descending, and landing. In this case, the number of blades on the electric motor driven propellers 905 may be increased to increase the amount of air blown over the wings and, therefore, provide additional control authority over the craft 100 (e.g., increase aero lift).

In some examples (as discussed elsewhere), the blades of one or the other of the internal combustion motor driven propellers 910 or the electric motor driven propellers 905 might have a fixed pitch, whereas in other examples, one or more (or all) of the blades might have a variable pitch. For instance, in some examples, the blades of the internal combustion motor driven propellers 910 might have a variable pitch and may rotate at a relatively constant speed, whereas the blades of the electric motor driven propellers 905 might have a fixed pitch and may rotate at a variable speed. According to some such examples, the fixed pitch props might be formed of a single piece composite. by contrast, the variable pitch propellers might be formed of a combination of multiple pieces.

Figure 10C:
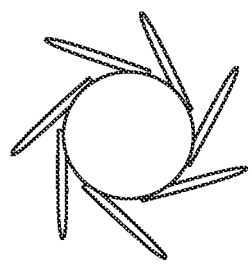
FIG. 10C illustrates blades of an electric motor propeller of a craft in a folded configuration, in accordance with example embodiments.
Figure 10B:
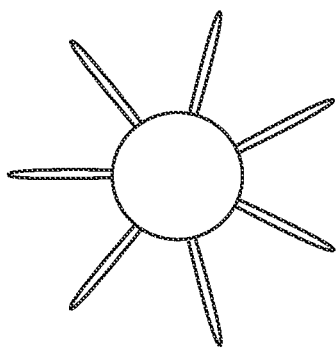
FIG. 10B illustrates blades of an electric motor propeller of a craft in a feathered configuration, in accordance with example embodiments.
Figure 10A:
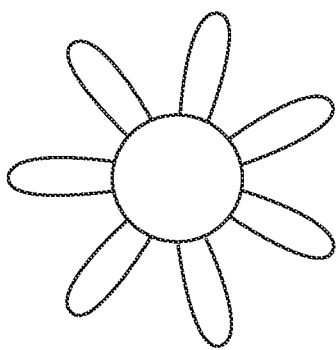
FIG. 10A illustrates blades of an electric motor propeller of a craft, in accordance with example embodiments.

In some examples, aspects of one or more of the electric motor driven propellers 905 (sometimes referred to herein as electric motor propellers for simplicity) are configured to be dynamically adjusted depending on the operational state of the craft 100. For example, the electric motor propellers 905 may be configured to generate a nominal amount of thrust when the craft is hull-borne, hydrofoil-borne, taking off, ascending, and landing and when the craft is cruising, the electric motor propellers 905 may be configured to generate little to no thrust while inducing the least amount of drag possible. For instance, in some examples of the electric motor propellers 905, the blades may have variable pitch and the pitch of the blades may be "feathered" when the craft 100 is cruising at altitude to reduce drag, as illustrated in FIGS. 10A and 10B. For example, the pitch of the blades may be increased to the point that the chord line of the blades is approximately parallel to the on-coming airflow to reduce the drag generated by the electric motor propellers 905. As shown in FIG. 10C, in some examples of the electric motor propellers 905, the blades may be folded inward to reduce drag. For example, the blades may be spring loaded such that centrifugal forces acting on the blades when the electric motor propellers 905 are spinning causes the blades to spin outward and provide thrust. When the electric motor propellers 905 are spun down, springs of the electric motor propellers 905 may urge the blades inward to a folded configuration.

In some examples, when the craft is operating in a state in which one or more of the electric motor propellers 905 are not intended to contribute to the craft's propulsion, one or more of the electric motor propellers 905 may be spun to a threshold point at which they introduce neither thrust nor drag. In some examples, such as when the electric motor propellers 905 operate at a constant speed, the pitch of the blades of the electric motor propellers 905 may be adjusted such that the electric motor propellers 905 introduce neither thrust nor drag. In this regard, some examples of the control system 500 may be configured to control aspects of the electric motor propellers 905 to introduce neither thrust nor drag. For example, the control system 500 may determine based on environmental conditions in which the craft 100 is operating (e.g., the airspeed, air temperature, etc.) and/or aspects of the craft (e.g., weight of the craft, amount of remaining fuel or battery energy, etc.), particular rotation rates, blade pitches, etc., to which one or more of the electric motor propellers 905 should be set so that the electric motor propellers 905 introduce neither thrust nor drag. In some examples, the control system 500 dynamically adjusts these aspects as the environmental conditions and/or the other aspects of the craft 100 change.

Some examples of the internal combustion motor driven propellers 910 (sometimes referred to herein as internal combustion motor propellers or combustion motor propellers for simplicity) correspond to a turboprop motor. Some examples of a turboprop motor can be mounted to the main wing 104 of the craft 100 in much the same way as an electric motor propellers 905. An example of a turboprop motor that can be used with the craft 100 corresponds to a Pratt and Whitney PT6 turboprop engine. A single PT6 engine can deliver upwards of 300 kW of power, which may be sufficient to facilitate the hybrid propulsion operations described herein. For example, such a turboprop engine may be used in the craft configuration shown in FIG. 9D. In examples that use two or more internal combustion engines, such as those shown in FIGS. 9A, 9B, and 9C, smaller/less powerful combustion engines that provide a combined output of 300 kW may be utilized.

Some examples of the combustion motor propellers 910 are optimized/tuned to use a specific type of fuel, such as 100LL, Jet A and/or JP8. Some examples of the combustion motor propellers 910 are optimized for continuous power efficiency, based on their intended use primarily or exclusively at cruise (e.g., while flying in wing-in-ground effect). In this regard, some examples of the combustion motor propellers 910 are configured to operate at a particular rotation rate and/or to deliver a particular amount of torque. In some examples, the combustion motor propellers 910 are optimized for use when the craft 100 is cruising at altitude, and the combustion motor propellers 910 may not be used/engaged, when the craft 100 is descending or is close to or on water (e.g., to avoid saltwater ingress into the combustion motor propellers 910).

V. HYBRID ELECTRICAL PROPULSION OPERATIONS

Figure 11A:
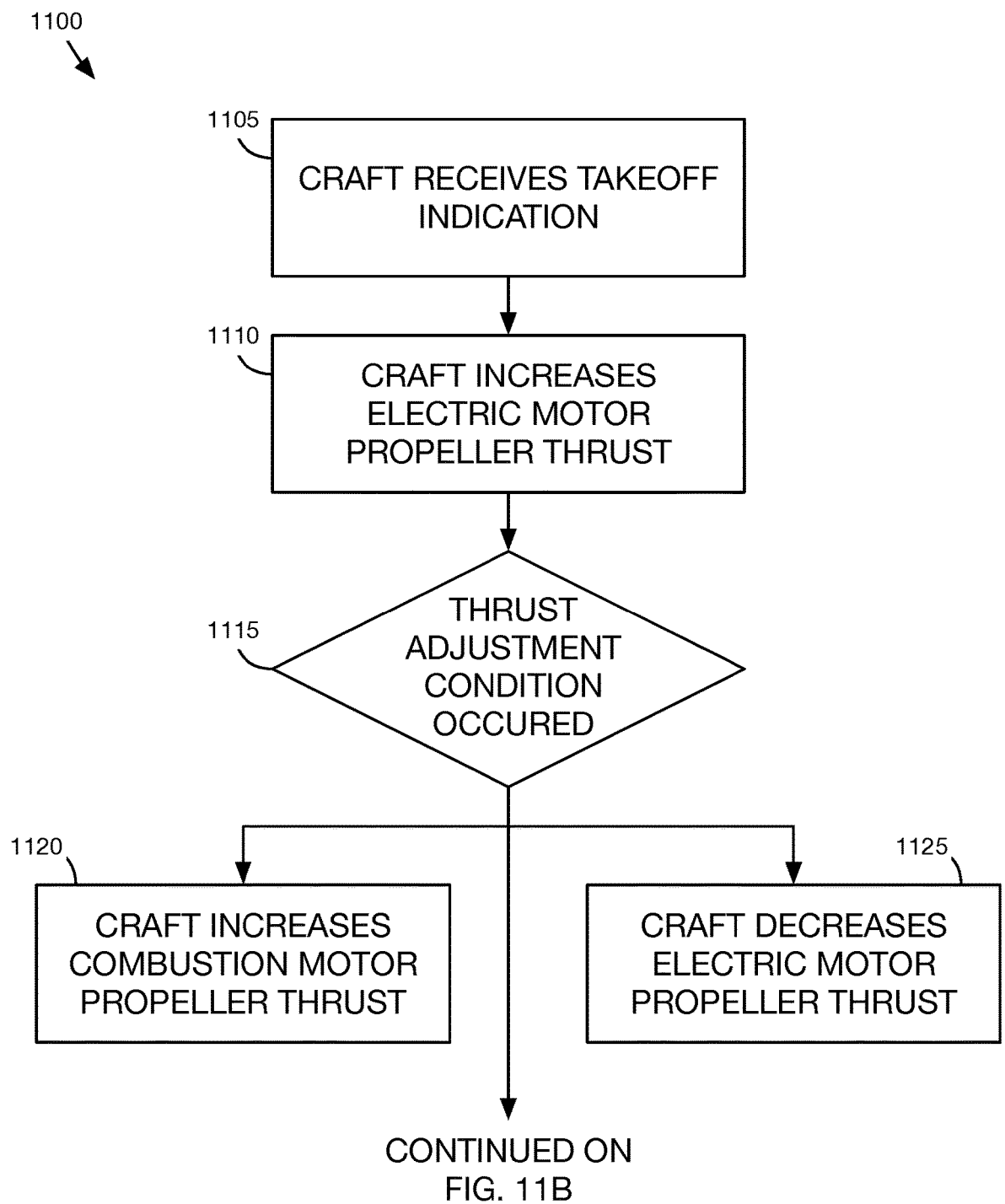
FIG. 11A illustrates operations performed by a craft that occur after receiving a takeoff indication, in accordance with example embodiments.
Figure 11B:
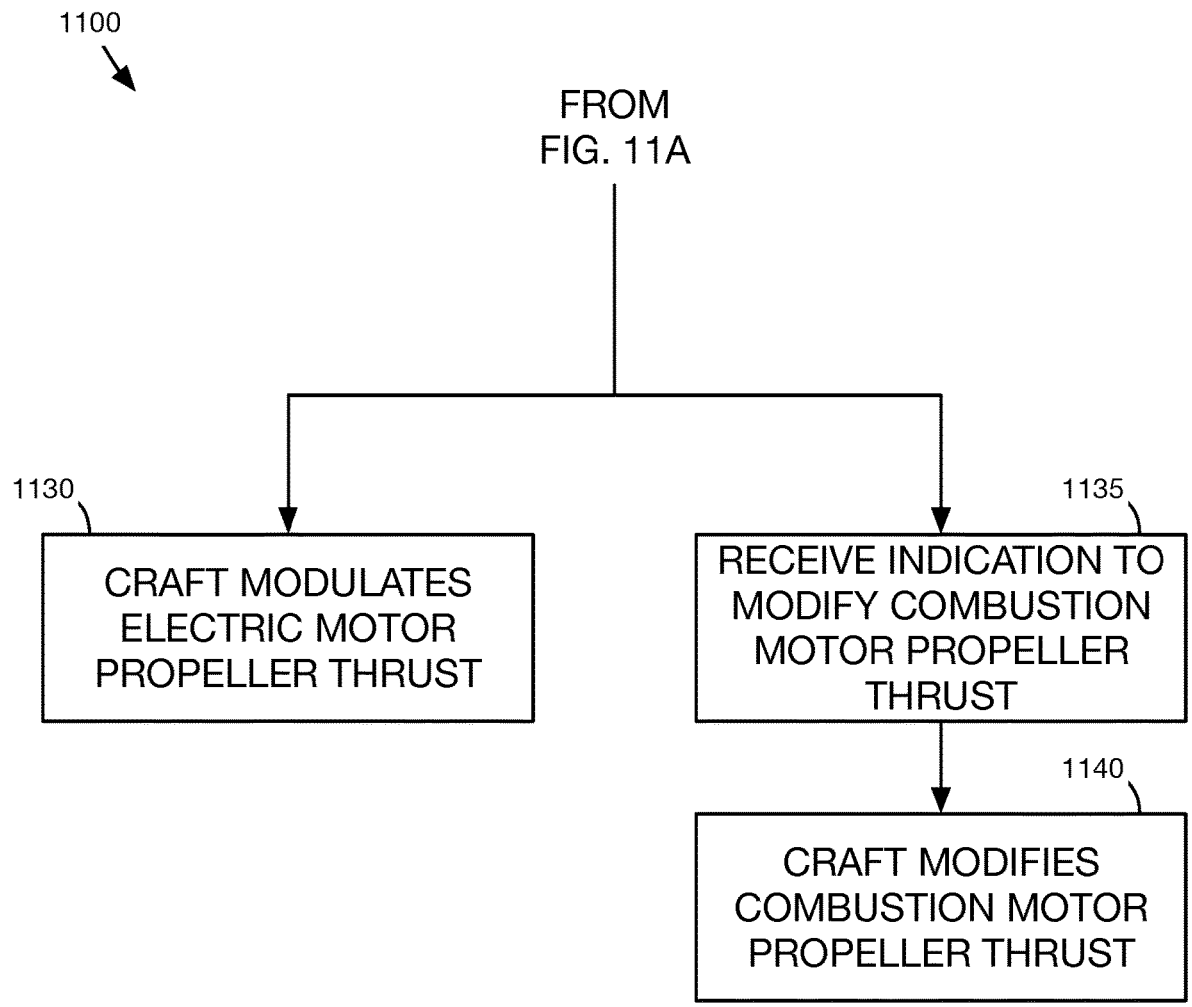
FIG. 11B illustrates operations performed by a craft that occur after receiving a takeoff indication, in accordance with example embodiments.
Figure 12:
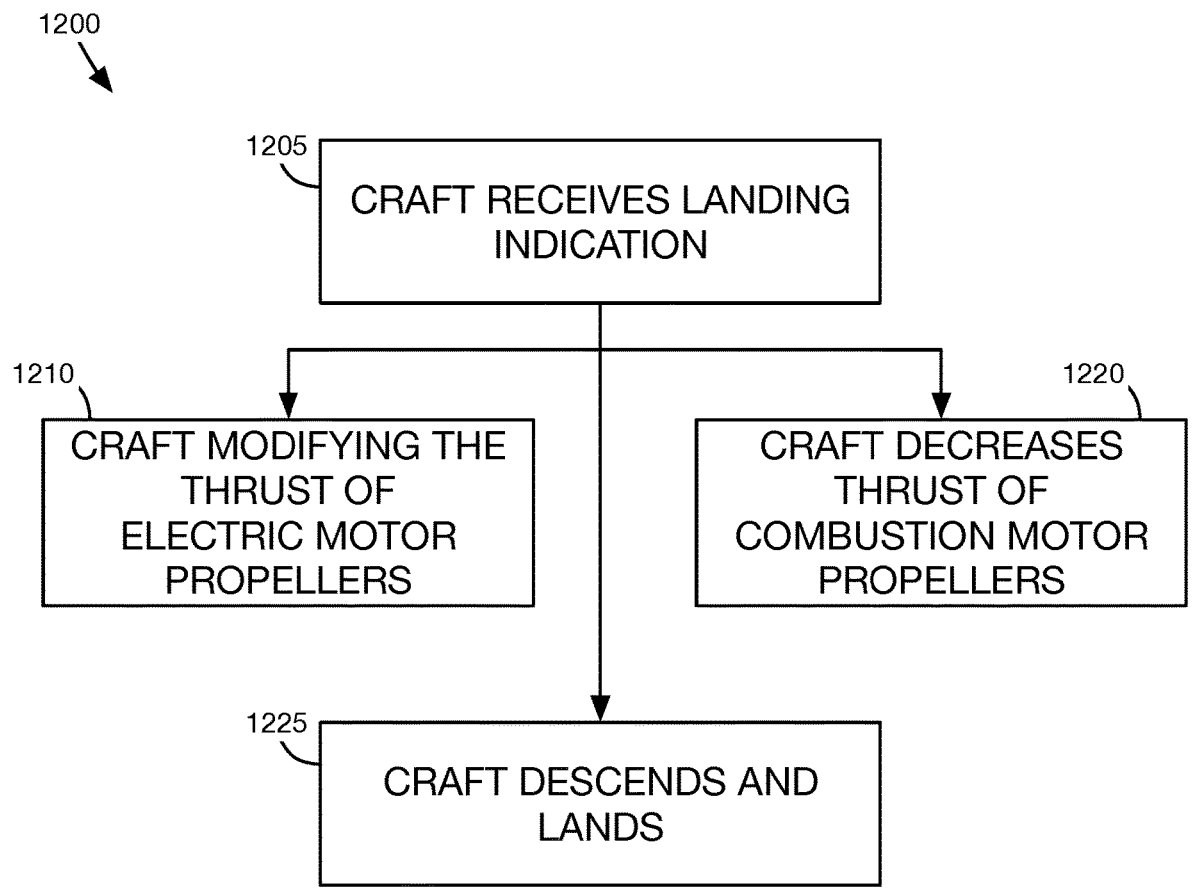
FIG. 12 illustrates operations performed by a craft that occur after receiving a landing indication, in accordance with example embodiments.
Figure 13:
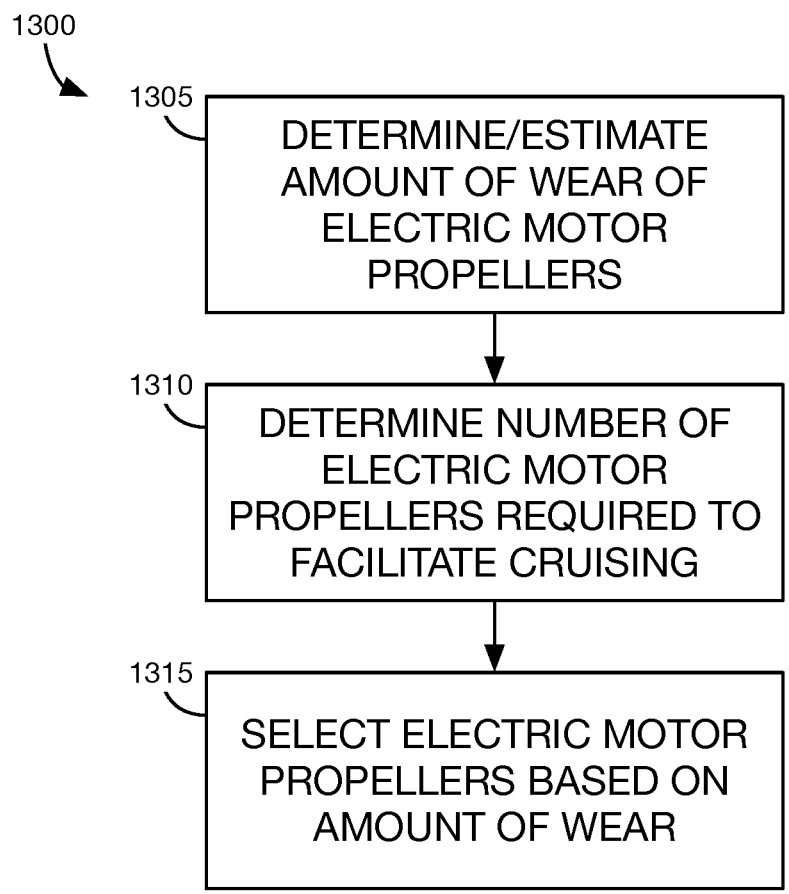
FIG. 13 illustrates operations performed by a craft that facilitate determining which electric motor propellers to engage, in accordance with example embodiments.

FIGS. 11A, 111B, 12, and 13 illustrate various examples of operations (1100, 1200, 1300) performed by the craft 100 that involve the use of the propulsion systems described above. FIGS. 11A and 11B illustrate operations performed by the craft 100 when taking off. FIG. 12 illustrates operations performed by the craft when landing. FIG. 13 illustrates operations performed by the craft 100 in selecting particular electric motor propellers 905 to disengage.

In some examples, the operations illustrated in FIGS. 11A, 111B, 12, and 13 are implemented via instruction code that is executed by one or more processors of the control system 500 of the craft 100 that causes the control system 500 to control, alone or in cooperation with other subsystems of the craft 100, components of the craft 100 to perform these operations. Additionally, or alternatively, one or more of the operations can be implemented or controlled by dedicated hardware, such as via one or more application-specific integrated circuits (ASICs). Some aspects of the operations may be executed as a result of or in combination with inputs received from an operator of the craft 100 or other subsystems of the craft 100. Other aspects of the operations may alternatively and/or additionally be executed automatically.

J. Example Takeoff Operations

Referring to FIGS. 11A and 111B, the operations at block 1105 involve the craft 100 receiving a takeoff indication. For instance, the craft 100 may be stationary and resting on its hull and then receive an indication from the pilot to cause the craft 100 to begin takeoff operations. In some examples, the takeoff indication may be received after the craft 100 is hydrofoil borne. For example, the takeoff indication may be received after the electric motor propellers 905 are generating sufficient thrust to cause the craft 100 to become hydrofoil borne.

In some examples, prior to this stage, the combustion motor propellers 910 may be disengaged. Alternatively, the combustion motor propellers 910 may be generating a first/nominal level of thrust that facilitates hull-borne and/or hydrofoil-borne maneuvering operations. In some examples, after receiving the takeoff indication, the thrust generated by the combustion motor propellers 910 may be increased to a second/cruising thrust that is by itself sufficient to allow the craft 100 to cruise at altitude. In some examples, the cruising thrust by itself is insufficient to allow the craft 100 to transition from being hydrofoil-borne to being airborne.

The operations at block 1110 involve the craft 100 increasing the thrust generated by one or more of the electric motor propellers 905. For example, after receiving the takeoff indication, the control system 500 of the craft 100 may cause one or more of the electric motor propellers 905 to generate a first/takeoff thrust or, if already generating a nominal amount of thrust, increase thrust to the takeoff thrust. The takeoff thrust generated by the electric motor propellers 905 may by itself be sufficient to allow the craft 100 to transition from being hydrofoil borne to being airborne. In examples where the combustion motor propellers 910 are generating the cruising thrust, the takeoff thrust may be such that the combination of the cruising thrust, and the takeoff thrust is sufficient to allow the craft 100 to transition from being hydrofoil-borne to being airborne.

After the takeoff thrust is generated, the speed of the craft 100 may increase, causing the craft to transition from the hull-borne mode of operation to the hydrofoil-borne mode of operation (e.g., if not already hydrofoil-borne) and then from the hydrofoil-borne mode of operation to the wing-borne mode of operation, at which point the craft 100 may leave the water and begin to gain altitude. In this regard, when transitioning between these operating modes, the craft 100 may perform various operations to coordinate the release of the hydrofoils of the craft 100 from the water to maintain control authority over the craft 100 during these transitions. Examples of the operations are described in U.S. application Ser. No. 17/885,463, filed Aug. 10, 2022, entitled "Hydrofoil Equipped Seaglider Takeoff", U.S. Provisional App. 63/374,596, filed Sep. 9, 2022, entitled "Hydrofoil Takeoff and Landing With Multiple Hydrofoils," and International App. PCT/US2023/29996, filed Aug. 10, 2023, entitled "Hydrofoil Takeoff and Landing With Multiple Hydrofoils." The entire contents of these applications are incorporated herein by reference in their entirety.

The operations at block 1115 involve determining whether a thrust adjustment condition has occurred. In some examples, the thrust adjustment condition corresponds to the craft attaining one or more craft cruising conditions. The attainment of the craft cruising condition may coincide with the craft 100 attaining a particular altitude and/or a particular airspeed. For instance, in examples where the craft 100 flies in ground effect, the particular altitude may be between about 30-60 ft. Note, the wing in-ground effect altitude may correspond to a distance that is less than about half the wingspan of the main wing. As such, the particular altitude may to an extent be a function of the wingspan. In some examples, the takeoff speed may be between about 45-50 knots and the landing speed might be about 50 knots. As such, in some examples, the particular airspeed may be somewhat greater than about 50 knots. Another example of a thrust adjustment condition that may be determined to occur includes a determination and/or estimation by the craft 100 that the craft 100 has left the water's surface (e.g., achieved flight). If at block 1115, the thrust adjustment condition has occurred, then the operations at block 1120 may be automatically performed (e.g., via the control system 500).

The operations at block 1120 involve the craft 100 optionally increasing the thrust generated by the combustion motor propellers 910 to the cruising thrust. For instance, as noted above, in some examples, the combustion motor propellers 910 may already be generating a cruising thrust that is by itself sufficient to allow the craft 100 to cruise at altitude, and therefore, no thrust adjustment of the combustion motor propellers 910 may be required. In some other examples where the combustion motor propellers 910 are not engaged or where the amount of thrust generated by the combustion motor propellers 910 is insufficient to allow the craft 100 to cruise at altitude, additional thrust may be required. As such, in some examples, after determining that the thrust adjustment condition has occurred, the control system 500 of the craft 100 may cause the combustion motor propellers 910 to generate the cruising thrust or, if already generating some thrust, to increase the thrust to the cruising thrust.

The operations at block 1125 involve the craft 100 optionally decreasing the thrust generated by one or more of the electric motor propellers 905. For example, the thrust may be decreased because the cruising thrust generated by the combustion motor propellers 910 is sufficient to allow the craft 100 to cruise at altitude. In some examples, decreasing the thrust involves disengaging one or more of the electric motor propellers 905 while perhaps leaving other electric motor propellers 905 engaged. For example, the outermost electric motor propellers 905 may remain engaged while the other electric motor propellers 905 may be disengaged. In some examples, the decreasing of the thrust generated by the electric motor propellers 905 occurs automatically after the thrust adjustment condition has occurred. In some examples, the decreasing of the thrust generated by the electric motor propellers 905 occurs a predetermined amount of time after the cruising conditions have been reached.

In some examples, such as where the blades of the electric motor propellers 905 have a variable pitch, disengaging the electric motor propellers 905 involves feathering the blades to reduce drag, as shown in FIG. 10B. For example, the pitch of the blades may be increased to the point that the chord line of the blades is approximately parallel to the on-coming airflow to reduce the drag generated by the electric motor propellers 905.

In some examples, such as where the blades of the electric motor propellers 905 can be folded inward, disengaging the electric motor propellers 905 involves or further involves folding the blades of the electric motor propellers 905 inwards to reduce drag, as shown in FIG. 10C. For example, the blades may be spring loaded such that centrifugal forces acting on the blades when the electric motor propellers 905 are spinning causes the blades to spin outward and provide thrust. When the electric motor propellers 905 are spun down, springs of the electric motor propellers 905 may urge the blades inward to a folded configuration.

In some examples, disengaging the electric motor propellers 905 involves or further involves spinning down the electric motor propellers 905 to a threshold point at which they introduce neither thrust nor drag. In some examples, such as when the electric motor propellers 905 operate at a constant speed, the pitch of the blades of the electric motor propellers 905 may be adjusted such that the electric motor propellers 905 introduce neither thrust nor drag. In this regard, some examples of the control system 500 may be configured to control aspects of the electric motor propellers 905 to introduce neither thrust nor drag. For example, the control system 500 may determine based on environmental conditions in which the craft 100 is operating (e.g., the airspeed, air temperature, etc.) and/or aspects of the craft 100 (e.g., weight of the craft, amount of remaining fuel or battery energy, etc.), particular rotation rates, blade pitches, etc., to which one or more of the electric motor propellers 905 should be set so that the electric motor propellers 905 introduce neither thrust nor drag. In some examples, the control system 500 dynamically adjusts these aspects as the environmental conditions and/or the other aspects of the craft 100 change.

In some examples, the thrust of all the electric motor propellers 905 is reduced during this stage. In some other examples, the thrust of a subset of the electric motor propellers 905 is reduced. For example, the thrust generated by the combustion motor propellers 910 may be insufficient to allow the craft 100 to cruise at a particular cruising airspeed. In this case, the control system 500 may continue to engage, for example, two of the electric motor propellers 905 (one on either side of the craft) and disengage the remaining electric motor propellers 905.

The operations at block 1130 involve the craft 100 optionally modulating the amount of thrust generated by the electric motor propellers 905. For instance, in some examples, if more thrust is required, the control system 500 may engage one or more additional electric motor propellers 905 that are not already engaged and/or increase the thrust being generated by one or more electric motor propellers 905 that are already generating thrust. For example, if the craft 100 experiences strong headwinds or if one or more of the combustion motor propellers 910 fails or otherwise becomes compromised, the control system 500 may engage additional electric motor propellers 905 and/or increase the thrust being generated by one or more electric motor propellers 905 to compensate. On the other hand, if less thrust is required, the control system 500 may disengage some of the electric motor propellers 905 and/or reduce the thrust being generated by one or more electric motor propellers 905 to compensate. In some examples, the control system 500 implements a closed loop system that dynamically engages and disengages the electric motor propellers 905 and/or adjusts the thrust of one or more electric motor propellers 905 based on the amount of thrust required.

In some examples, the control system 500 adjusts the rotation of the electric motor propellers 905 and/or the blade pitch of the electric motor propellers 905 to modulate the thrust generated by the electric motor propellers 905.

In some examples, the control system 500 increases the thrust of a subset of the electric motor propellers 905 to some maximum threshold (e.g., by increasing the rotation rate, blade pitch, etc.) before engaging additional electric motor propellers 905.

The operations at block 1135 involve the craft 100 optionally receiving an indication that the craft 100 should modify the amount of thrust being generated by the combustion motor propellers 910. Such an indication may be received from the pilot, automatically from the control system, etc. For example, a stealth indication (e.g., triggered by the pilot) may be generated to indicate that the combustion motor propellers 910 should be disengaged to reduce the heat signature of the craft 100. A range warning indication may be generated by the control system 500 to indicate that the combustion motor propeller thrust should be reduced to an extent to increase the full efficiency of the craft 100 and thereby increase the range of the craft 100. In some examples, the control system 500 makes this determination based on factors such as the remaining amount of fuel, the fuel consumption rate, the drag generated at the current airspeed, etc.

The operations at block 1140 involve the craft 100, in response to receiving the indication, modifying the amount of thrust generated by the combustion motor propellers 910 For example, the control system 500 may cause the combustion motor propellers 910 to disengage and/or to generate a reduced amount of thrust. In some examples, the control system 500 may simultaneously cause the electric motor propellers 905 to increase thrust to compensate for the loss of thrust generated by the combustion motor propellers 910. In this regard, the control system 500 may engage additional electric motor propellers 905 and/or cause the electric motor propellers 905 to generate more thrust (e.g., by increasing the rotation rate, blade pitch, etc.)

K. Example Landing Operations

Referring to FIG. 12, the operations at block 1205 involve the craft 100 receiving a landing indication. For instance, the craft 100 may be airborne and cruising towards a destination and then receive a landing indication from the pilot to cause the craft 100 to begin landing operations.

The operations at block 1210 involve the craft 100 optionally modifying the thrust generated by the electric motor propellers 905. For example, electric motor propellers 905 that were previously disengaged by the control system 500 may be engaged by the control system 500. Electric motor propellers 905 that were generating thrust may be commanded by the control system 500 to increase thrust. In some examples, the control system 500 may modulate the thrust generated by the electric motor propellers 905 (i.e., increase and decrease the thrust) perhaps to maintain the craft 100 on a particular glide path.

In some examples, increasing the thrust generated by the electric motor propellers 905 involves spinning up the electric motor propellers 905 so that they generate thrust. In some examples, this may further involve adjusting the pitch of the blades of the electric motor propellers 905 to cause the electric motor propellers 905 to generate thrust. In some examples, such as where the blades of the electric motor propellers 905 can be folded inward, re-engaging of the electric motor propellers 905 involves spinning up the electric motor propellers 905 to cause the blades to spin outward and to provide thrust (e.g., transitioning from the configuration shown in FIG. 10C to the configuration shown in FIG. 10A).

The operations at block 1220 involve the craft 100 optionally decreasing the thrust generated by the combustion motor propellers 910. In some examples, decreasing the thrust involves the control system 500, causing the combustion motor propellers 910 to completely spin down. In some examples, decreasing the thrust involves the control system 500, causing the combustion motor propellers 910 to spin down to a nominal rotation rate.

In some examples, the control system 500 causes the thrust generated by the combustion motor propellers 910 to decrease after determining that the electric motor propellers 905 are generating sufficient thrust to at least momentarily maintain the craft 100 at the cruising altitude. In some examples, the control system 500 gradually causes the combustion motor propellers 910 to reduce thrust while causing the electric motor propellers 905 to increase thrust so that the overall thrust generated by the propellers remains relatively constant during the transition.

The operations at block 1225 involve the craft 100 descending and then landing. In some examples, the craft 100 starts to descend after the thrust generated by the combustion motor propellers 910 has been decreased. In some examples, the increasing of the thrust generated by the electric motor propellers 905 and the decreasing of the thrust generated by the combustion motor propellers 910 that started in the previous operation continues as the craft 100 descends. In this regard, in some examples, the increasing of the thrust generated by the electric motor propellers 905 and the decreasing of the thrust generated by the combustion motor propellers 910 completes before the craft has contacted the water (e.g., before becoming hydrofoil borne). Decreasing and/or disabling the combustion motor propellers 910 prior to water contact minimizes the chances of the combustion motor propellers 910 ingesting, for example, water within the throttle body and into the combustion chamber. In this regard, some examples of the combustion motor propellers 910 comprise an actuatable air-intake cover that can be closed to prevent water from being ingested. In some examples, the control system 500 automatically closes the air-intake cover after the combustion motor propellers 910 are disengaged and automatically opens the air-intake cover prior to engaging the combustion motor propellers 910.

L. Example Electric Motor Propellers Selection Operations

FIG. 13 illustrates examples of operations 1300 that may be performed during the operations of block 1125 of FIG. 11A to select those electric motor propellers 905 that should be disengaged. The operations at block 1305 involve determining and/or estimating the amount of wear each of the electric motor propellers 905 may have experienced and/or may potentially experience. The determined amount of wear may depend on various factors such as the operating/uptime of the electric motor propellers 905, the average rotation rate of the electric motor propellers 905 during this time, environmental conditions under which the electric motor propellers 905 have been operated, etc. In some examples, the estimated amount of wear may be based on a prediction of how these factors will vary due to future use of the craft 100.

The operations at block 1210 involve determining the number of electric motor propellers 905 required to facilitate cruising. For example, the control system 500 may determine that the craft 100 is unable to attain a target cruising airspeed with just the combustion motor propellers 910 and may determine that two electric motor propellers 905 should be engaged to allow the craft 100 to reach the target cruising airspeed.

The operations at block 1215 involve selecting those electric motor propellers 905 to engage (or that should remain engaged) based on the amount of wear. In this regard, in some examples, these operations involve determining a matching pair or pairs of electric motor propellers 905 (e.g., electric motor propellers 905 on the port and starboard sides of the main wing 105 that are symmetrical to one another) that have the lowest average amount of wear.

In some examples, the particular electric motor propellers 905 of the subset that are engaged may be changed from time to time. For example, the control system 500 may choose different electric motor propellers 905 to engage every ten minutes to facilitate load balancing.

In some examples, the amount of wear on the combustion motor propellers 910 can similarly be determined based on factors such as the operating/uptime of the combustion motor propellers 910, the average rotation rate of the combustion motor propellers 910 during this time, environmental conditions under which the combustion motor propellers 910 have been operated, etc. In some of the examples, as the wear on the combustion motor propellers 910 increases, more reliance may be placed on the electric motor propellers 905. For instance, when the craft is cruising at altitude, the control system 500 may determine that the wear on the combustion motor propellers 910 has exceeded a threshold amount and responsively cause the combustion motor propellers 910 to generate a reduced amount of thrust and cause the electric motor propellers to increase thrust to compensate for the reduction.

In examples of the craft 100 that include multiple combustion motor propellers 910 on each side of the craft 100 where the combustion motor propellers 910 are not operating for the same amount of time and/or generating the same amount of thrust, the determined wear can be used to ensure more equal operation/usage of the combustion motor propellers 910. For example, if the innermost combustion motor propellers 910 have been operated more often and/or have been generating more thrust than the other combustion motor propellers 910, the relative operating time and/or thrust of the other combustion motor propellers 910 can be increased (relative to the innermost combustion motor propellers 910) to balance the wear on the combustion motor propellers 910.

VI. CONCLUSION

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A craft comprising:
   at least one hull;
   a main wing coupled to the at least one hull and configured to facilitate airborne operations of the craft;
   a plurality of propellers that include one or more electric motor propellers and one or more combustion motor propellers arranged along each of a port side and a starboard side of the main wing and configured to generate lift on the craft by blowing air over the main wing; and
   a control system that comprises data storage having instruction code stored thereon that, when executed by one or more processors of the control system, causes the control system to:
   after receiving a takeoff indication, increase thrust generated by the one or more electric motor propellers to cause the craft to transition from a hull-borne mode of operation to an airborne mode of operation; and
   after a thrust adjustment condition occurs, increase thrust generated by the one or more combustion motor propellers.

2. The craft according to claim 1, further comprising instruction code that causes the control system to:
   after the thrust adjustment condition occurs, decrease the thrust generated by one or more of the one or more electric motor propellers.

3. The craft according to claim 2, wherein blades of the one or more electric motor propellers have a variable pitch, wherein the instruction code that causes the control system to decrease the thrust generated by the one or more of the one or more of the electric motor propellers after the thrust adjustment condition occurs comprises instruction code that causes the control system to:
   cause the blades of the one or more of the one or more of the electric motor propellers to be feathered to reduce drag.

4. The craft according to claim 2, wherein the one or more electric motor propellers comprises blades that are urged to be folded inward, wherein the instruction code that causes the control system to decrease the thrust generated by the one or more of the one or more of the electric motor propellers after the thrust adjustment condition occurs comprises instruction code that causes the control system to:
   reduce a rotation rate of the one or more of the one or more electric motor propellers to cause the blades to be folded inward.

5. The craft according to claim 2, wherein the instruction code that causes the control system to decrease the thrust generated by the one or more of the one or more of the electric motor propellers after the craft reaches the thrust adjustment condition occurs comprises instruction code that causes the control system to:
   spin down the one or more of the one or more of the electric motor propellers to a threshold point at which they introduce neither thrust nor drag.

6. The craft according to claim 2, wherein the instruction code that causes the control system to decrease the thrust generated by the one or more of the one or more electric motor propellers after the thrust adjustment condition occurs comprises instruction code that causes the control system to:
   decrease the thrust generated by a first of the one or more electric motor propellers that is on the port side of the main wing and a second of the one or more electric motor propellers on the starboard side of the main wing that is symmetrically opposite the first of the one or more electric motor propellers.

7. The craft according to claim 1, further comprising instruction code that causes the control system to:
   maintain the one or more combustion motor propellers in a disengaged state up until the thrust adjustment condition occurs.

8. The craft according to claim 1, wherein the one or more combustion motor propellers comprises a first combustion motor propeller positioned on the port side of the main wing and a second combustion motor propeller positioned on the starboard side of the main wing, and wherein the first combustion motor propeller and the second combustion motor propeller are propellers of the plurality of propellers that are nearest to the hull.

9. The craft according to claim 1, wherein the one or more combustion motor propellers comprises a first combustion motor propeller positioned on the port side of the main wing and a second combustion motor propeller positioned on the starboard side of the main wing, wherein the first combustion motor propeller and the second combustion motor propeller are positioned at respective sections of the main wing such that a wake of air generated by the first combustion motor propeller and the second combustion motor propeller contributes less control authority over the craft than other propellers of the plurality of propellers.

10. The craft according to claim 1, wherein the one or more combustion motor propellers comprises a first combustion motor propeller positioned on the port side of the main wing and a second combustion motor propeller positioned on the starboard side of the main wing, wherein the first combustion motor propeller and the second combustion motor propeller are positioned at respective sections of the main wing such that a wake of air generated by the first combustion motor propeller and the second combustion motor propeller contributes more control authority over the craft than other propellers of the plurality of propellers.

11. The craft according to claim 1, wherein the instruction code that causes the control system to, after the thrust adjustment condition occurs, increase the thrust generated by the one or more combustion motor propellers comprises instruction code that causes the control system to:
   increase the thrust generated by the one or more combustion motor propellers after the craft reaches a particular cruising altitude.

12. The craft according to claim 1, wherein the instruction code that causes the control system to, after the thrust adjustment condition occurs, increase the thrust generated by the one or more combustion motor propellers comprises instruction code that causes the control system to:
   increase the thrust generated by the one or more combustion motor propellers after the craft reaches a particular cruising airspeed.

13. The craft according to claim 1, further comprising instruction code that causes the control system to:
   determine an amount of wear of each of the one or more electric motor propellers; and
   after the thrust adjustment condition occurs, engage one or more of the one or more electric motor propellers having a lowest amount of wear.

14. A craft comprising:
   at least one hull;
   a main wing coupled to the at least one hull and configured to facilitate airborne operations of the craft;

a plurality of electric motor propellers arranged along each of a port side and a starboard side of the main wing and configured to generate lift on the craft by blowing air over the main wing;

at least one combustion motor propeller arranged proximate to a tail section of the craft; and a control system that comprises data storage having instruction code stored thereon that, when executed by one or more processors of the control system, causes the control system to:

after receiving a takeoff indication, increase thrust generated by one or more of the plurality electric motor propellers to cause the craft to transition from a hull-borne mode of operation to an airborne mode of operation; and after a thrust adjustment condition occurs, increase thrust generated by the at least one combustion motor propeller.

15. The craft according to claim 14, further comprising instruction code that causes the control system to:

after the thrust adjustment condition occurs, decrease the thrust generated by one or more of the plurality electric motor propellers.

16. The craft according to claim 15, wherein blades of the one or more of the plurality electric motor propellers have a variable pitch, wherein the instruction code that causes the control system to decrease the thrust generated by the one or more of the one or more of the electric motor propellers after the thrust adjustment condition occurs comprises instruction code that causes the control system to:

cause the blades of the one or more of the plurality of electric motor propellers to be feathered to reduce drag.

17. The craft according to claim 15, wherein the one or more of the plurality electric motor propellers comprises blades that are urged to be folded inward, wherein the instruction code that causes the control system to decrease the thrust generated by the one or more of the one or more of the electric motor propellers after the thrust adjustment condition occurs comprises instruction code that causes the control system to:

reduce a rotation rate of the one or more of the one or more of the plurality electric motor propellers to cause the blades to be folded inward.

18. The craft according to claim 15, wherein the instruction code that causes the control system to disengage the one or more of the one or more of the electric motor propellers after the thrust adjustment condition occurs comprises instruction code that causes the control system to:

spin down the one or more of the one or more of the electric motor propellers to a threshold point at which they introduce neither thrust nor drag.

19. The craft according to claim 15, wherein the instruction code that causes the control system to decrease the thrust generated by the one or more of the one or more of the plurality electric motor propellers after the thrust adjustment condition occurs comprises instruction code that causes the control system to:

disengage a first of the one or more of the plurality electric motor propellers that is on the port side of the main wing and a second of the one or more of the plurality electric motor propellers on the starboard side of the main wing that is symmetrically opposite the first of the one or more of the plurality electric motor propellers.

20. The craft according to claim 14, further comprising instruction code that causes the control system to:

maintain the at least one combustion motor propeller in a disengaged state up until the craft reaches one or more cruising conditions.

* * * * *